June 18, 1940. E. A. THOMPSON 2,204,872
CHANGE SPEED GEARING AND CONTROL
Filed April 1, 1938 8 Sheets-Sheet 2

Inventor
Earl A. Thompson
By
Blackmore, Spencer & Flint
Attorneys

Inventor
Earl A. Thompson

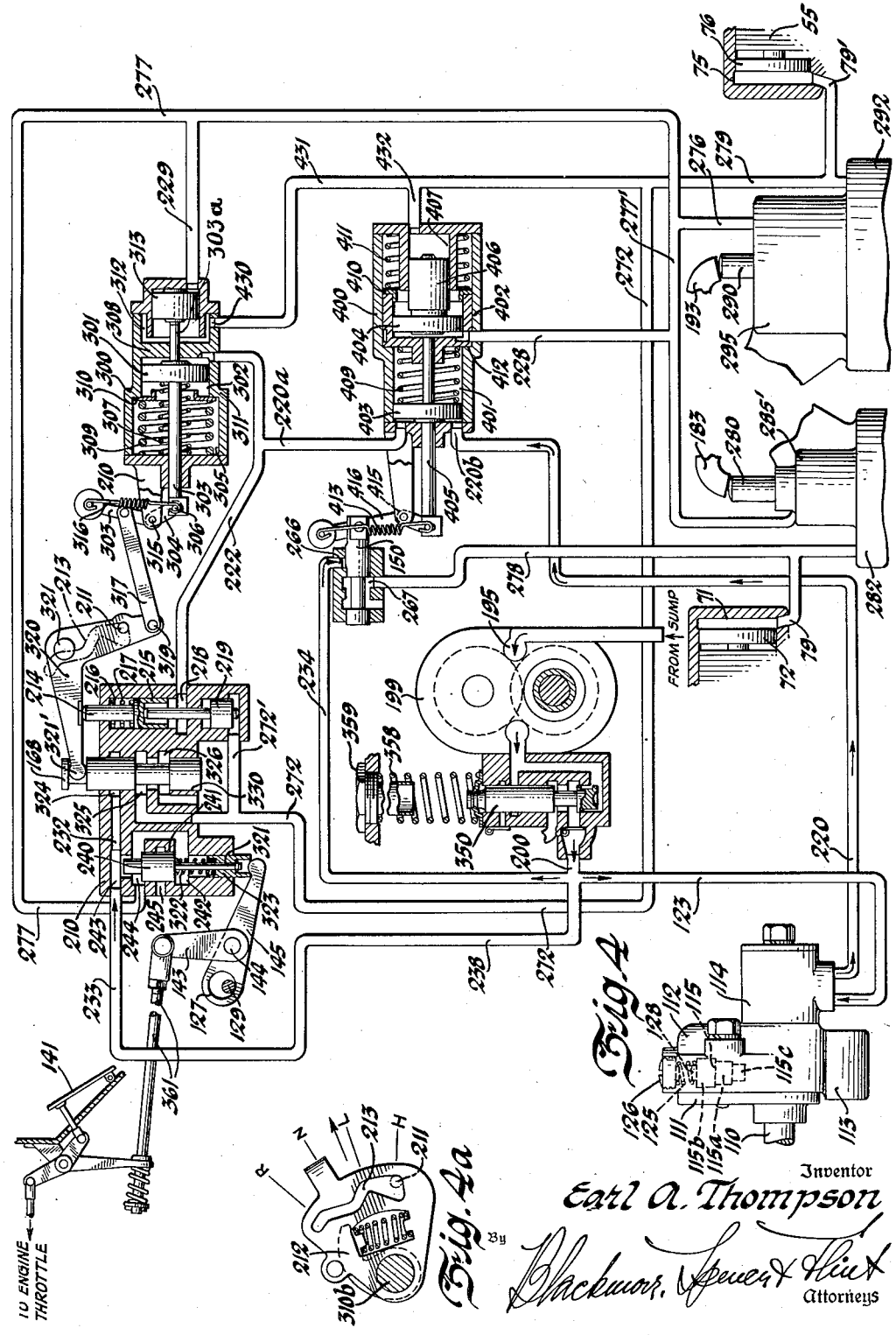

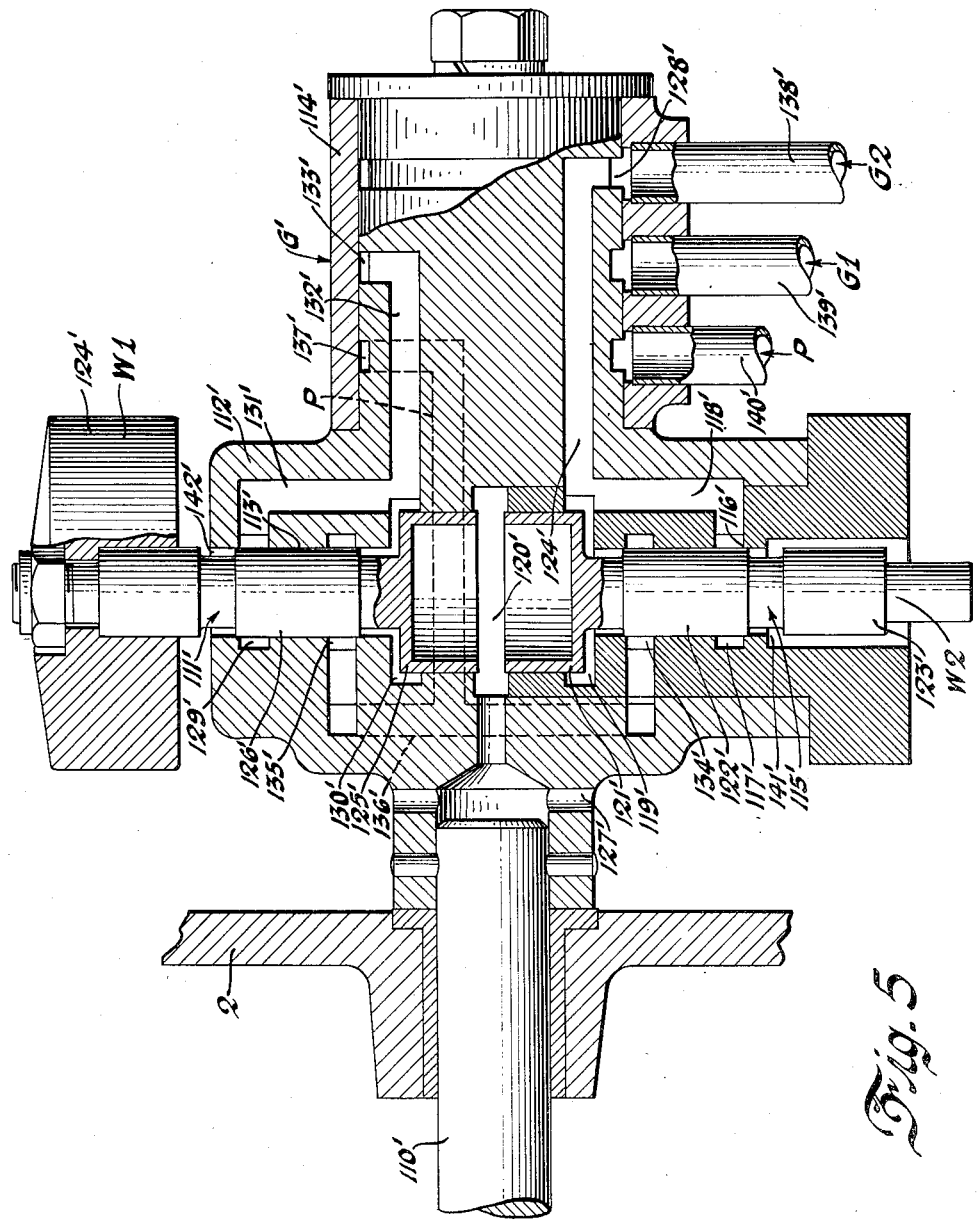

June 18, 1940.  E. A. THOMPSON  2,204,872
CHANGE SPEED GEARING AND CONTROL
Filed April 1, 1938  8 Sheets-Sheet 6
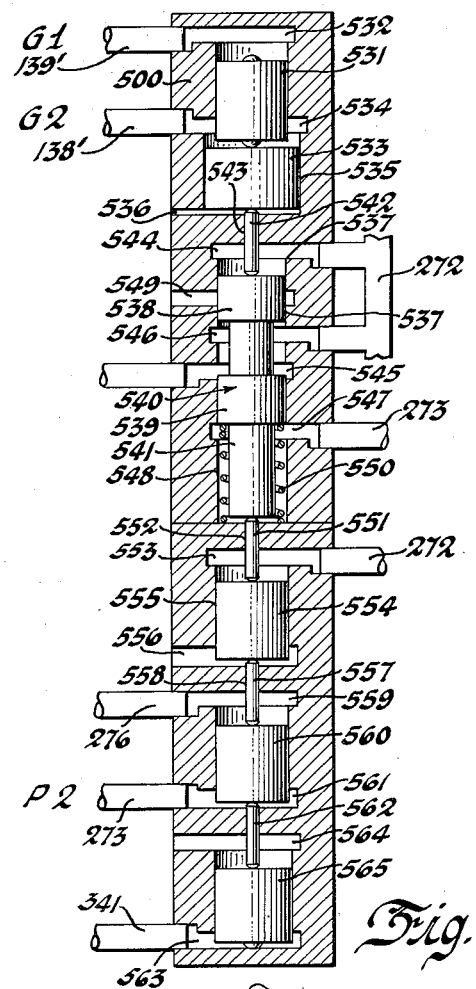
Fig. 6
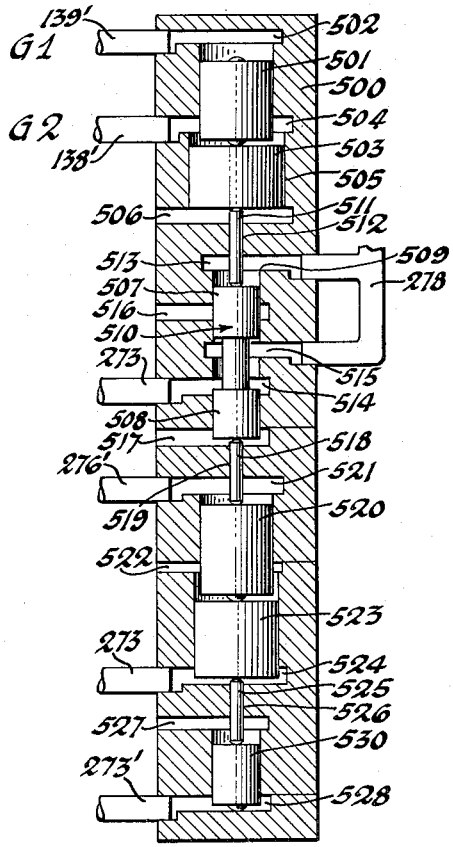
Fig. 7
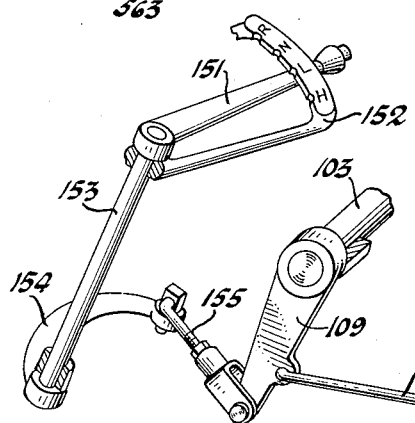
Fig. 13
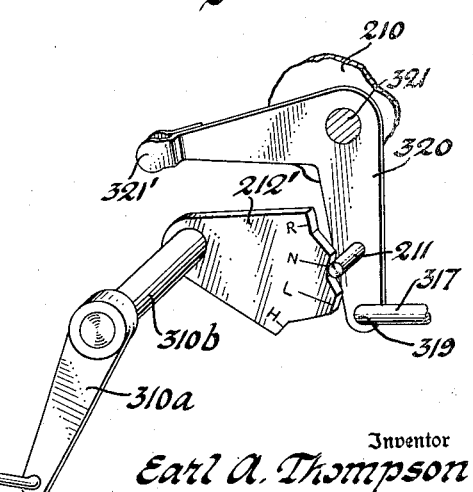
Inventor
Earl A. Thompson
By Blackmore, Spencer & Flint
Attorneys

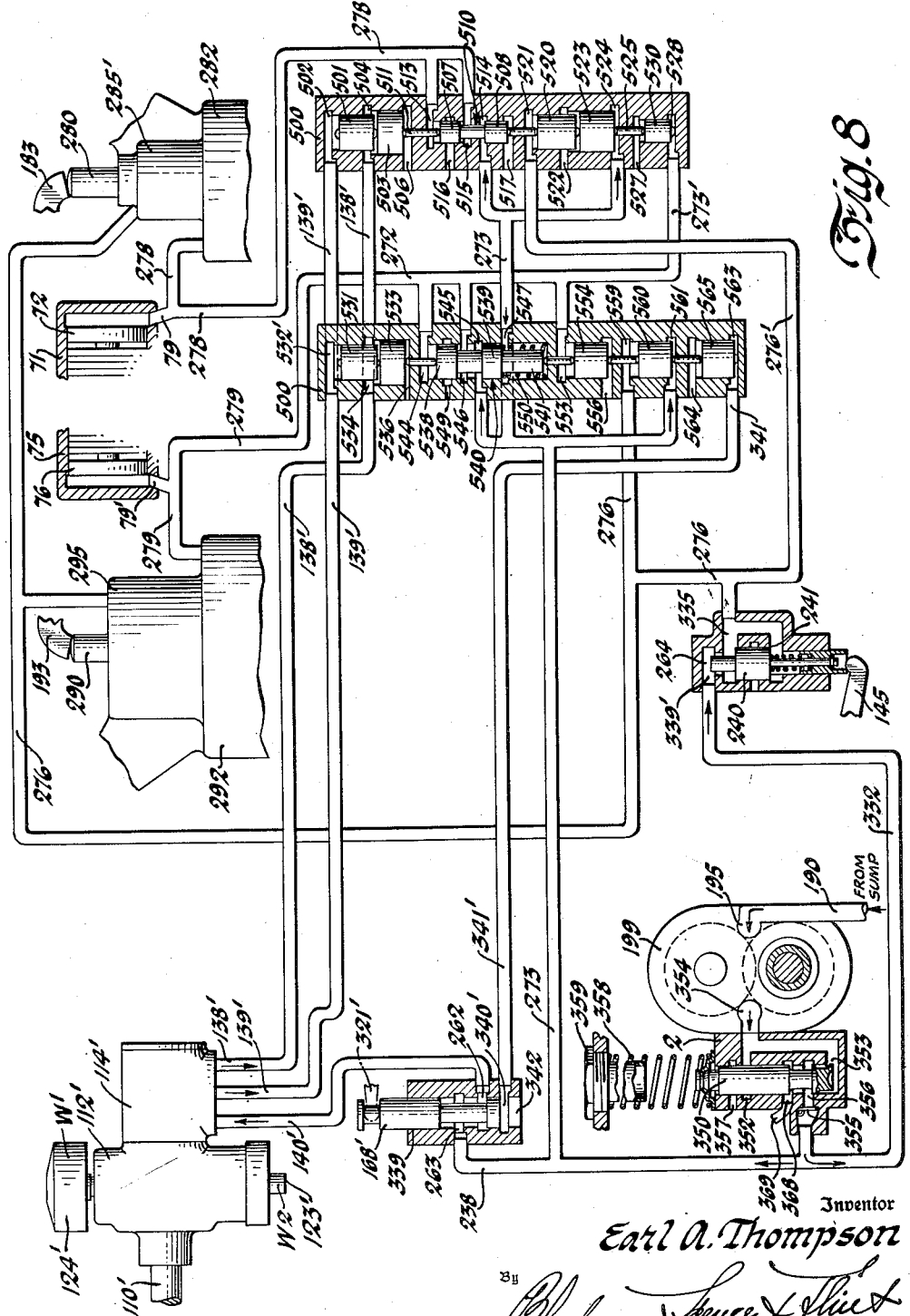

Patented June 18, 1940

2,204,872

UNITED STATES PATENT OFFICE 2,204,872

CHANGE SPEED GEARING AND CONTROL

Earl A. Thompson, Bloomfield Hills, Mich., assignor to General Motors Corporation, Detroit, Mich., a corporation of Delaware Application April 1, 1938, Serial No. 199,355

50 Claims. (Cl. 74—472)

The invention relates to the controls for change speed gearing mechanism, in particular for motor driven vehicles. It is directed to improvements wherein independently acting automatic and manual control members are coordinated to produce an ideal, fully automatic selection of speed ratio in step ratio gearing, yielding acceleration or economy according to the demand for torque on the part of the operator. It is well-known that present day motor cars, as an example, are equipped with step-ratio gearing which requires considerable personal attention on the part of the driver, if the varying traffic conditions are to be met. The invention represents a number of related improvements wherein a graduated automatic selection of speed ratios is always available for any driving condition, with a minimum of shock during the ratio transitions, and a minimum of attention on the part of the driver.

The invention provides smooth, completely automatic shift among all forward speed ratios, wherein the factor of driver-will as determined by variations in the position of the operator's accelerator pedal, modifies the automatic ratio selecting mechanism, and for all ratio changes, likewise establishes the action of the driving coupling which is to take drive in the new ratio. The invention utilizes fluid pressure means in the example given herewith, for interconnecting the elements of the control system, and the actuation system, whereby the described effects are accomplished.

In the application of the invention due consideration has been given to automatically controlled fluid pressure servo actuated systems of the prior art having superficial similarities. Such showings of step ratio gearing having fluid pressure actuation of selected friction members, and some form of governor or equivalent selection control are ordinarily based on the general idea of having the automatic action duplicate as nearly as possible, the manual control functions of a vehicle operator. It follows therefore, that a method of automatic freewheeling which in some way may release drive on one or more of the driving elements, for example, through by-pass or release of the fluid pressure, provides a commonly understood means for establishing a neutral dwell during the shift interval. The adaptation of the so-called automatic clutch control to assist in "automatic" gearshifting is a well-known expedient. Its control by the engine accelerator pedal is also known in the prior art.

Since portions of the present invention bear a superficial resemblance to devices of the above noted character, it is believed of primary importance to distinguish clearly from them, wherein the utility and true purpose of the structures in my invention will be apparent, and wherein its unique and novel features will be understood.

A very considerable simplification in the number of control pedals, handles and buttons is desirable for safety reasons in present day motor vehicles.

The interconnecting means of my invention, linking elements moved by a governor with other elements moved by the engine accelerator pedal provide a fully automatic speed ratio selection control for a form of step-ratio transmission in which there is no established neutral dwell period during the shift interval. Instead, there is a distinct overlap during the interval, arranged through the proper selection of operating principles, so that the new driving element begins to assume drive at a given torque capacity value, while the element which is being released ceases to drive only when that value is established. The doubling up of the controls for these functions eliminates a number of members which an ordinary gearbox control presents for driver manipulation.

The invention describes a primary method of regulating the shift transition torque capacity values, discloses a secondary method wherein the ratio setting itself varies the values, and discloses a further method of control which evaluates speed and torque indices, for a completely automatic ratio shift sequence.

This is in no sense a freewheeling control of a friction clutch or group of clutches, but is a control for a step-ratio transmission having inherent torque overlap during the shift interval, whereby the conditions of drive and the intent of the driver are reflected in the manner in which the transition between fixed ratio steps is accomplished.

My invention therefore combines the two features of driver participation in ratio selection, and the control over the torque capacity of the driving elements, at values always above a predetermined minimum torque value, the coordinating means being fluid pressure connected.

One outstanding advantage of the system of the invention is the elimination of torque shock between the engine and the load. Of equivalent importance is the fact that it eliminates the very considerable momentum and power loss common to step-ratio changing devices which do require the neutral dwell, or no-drive period for the shift interval. It will be readily understood that each time an engine decelerates to idling accompanied by the slip loss of friction engagement of the new ratio, the energy expenditure to bring the rotating mass of the engine to a low relative speed, and to raise it again to a new level, is expended without return. There is a loss of fuel energy during the idling period, and the further slippage loss of the friction elements assuming drive. With my system, the inertia loss is only the small difference between the inertia value at one engine speed and the value at a second engine speed proportional to the step speed ratio difference between adjacent speed ratios. My invention eliminates the idling loss, and shows a negligible slip loss. These are facts well demonstrated in actual practice, and are not in any sense theoretical, having been demonstrated against the performance of the other type of devices in which a neutral dwell shift is required.

The performance of a number of types of infinitely variable transmissions, automatically controlled, is known, and affords a comparison guide for my invention against the ideal, as well as for my invention against those forms utilizing the neutral-dwell principle. This discloses that my provision of the continuous, "overlapping" torque actuation method, with a constant control available for the overlapping value as well as the driving capacity values, in conjunction with driver-dominated automatic ratio controls which select ratio according to the traffic conditions and the ability of the vehicle engine, yields profoundly new and different results. As far as the vehicle driver is concerned, the free-will ability to drive with full acceleration, or with advantageous ratio for economy, gives a new activity of response not found in the compared form using the neutral-dwell principle, as well as a new degree of smoothness and effortless operation.

The invention further provides calibration means wherein the various control factors may be adjusted to accommodate variations in the type of operation demanded of the vehicle in which the installation is placed.

It is believed that the demonstration of the present invention establishes an unquestionably close approximation to the results obtained with continuously variable transmissions of the friction type, wherein an ideal selection pattern for speed ratio yields full automatic controls for both economy and performance ratios.

Among other objects, the invention discloses a form of governor which provides unique means for controlling sequences of automatic ratio shift through variations in fluid pressure, and solves a problem of coordinating the speed effect with the effect of driver will on a continuously operative cycle.

Modifications of the form of governor and associated ratio selector mechanism are given to provide those skilled in the art with sufficient data to adapt the method herein described to a wide range of vehicle and power installation applications.

Further improvements are likewise shown in the interlocking of the overcoming manual controls with the automatically operating controls such that while a regime of full automatic speed ratio shift is permitted, the manual controls may overcome and compel shift to a selected ratio for emergency purposes.

Additional objects are achieved in the interconnection of metering valving, automatically operated, through fluid pressure columns with the selector valving determining ratio, wherein shift interval torque may be varied according to the driving conditions. Herein, likewise, are provided modifications of the method, for a fully useful disclosure of broad applicability.

An additional object is the providing of a special form of ratio control for variable speed gearing in which during the automatic shift period a simultaneous shift of ratio determining elements is required, the control method involving an overlapping of the net torque from one element to another, wherein a maximum of smoothness and minimum of slip loss occurs during the transition.

A general object is to approximate in efficiency with a step ratio gearing, that of the ideal infinitely variable gear, through particular methods of selecting the ratio and regulation of the torque characteristics for the ratio transition period.

These and other objects will appear in the subjoined text and accompanying drawings.

Figure 1:
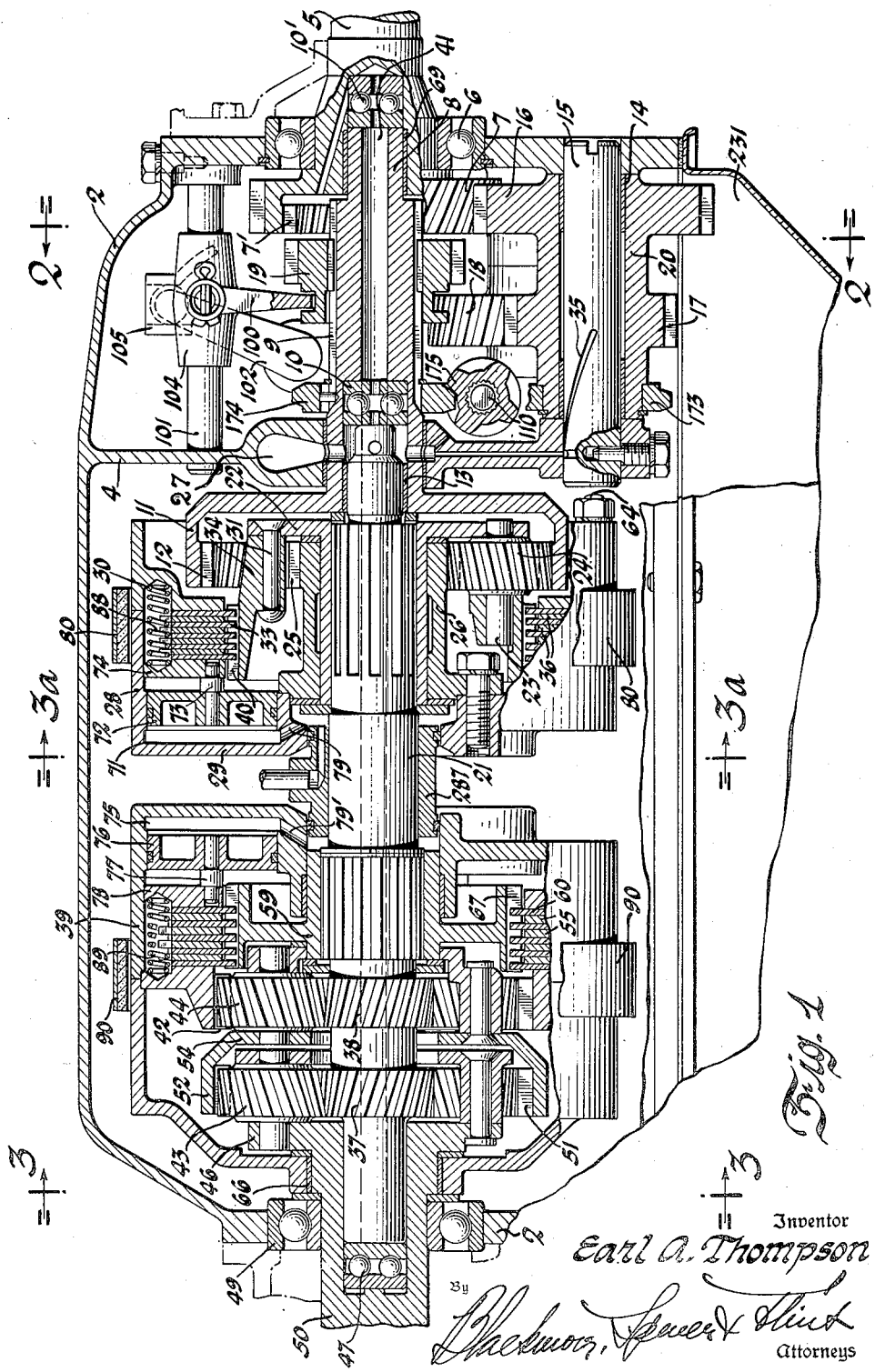
Figure 1 is a vertical, longitudinal section of the transmission assembly of my example, with the engine shaft at the right.
Figure 2:
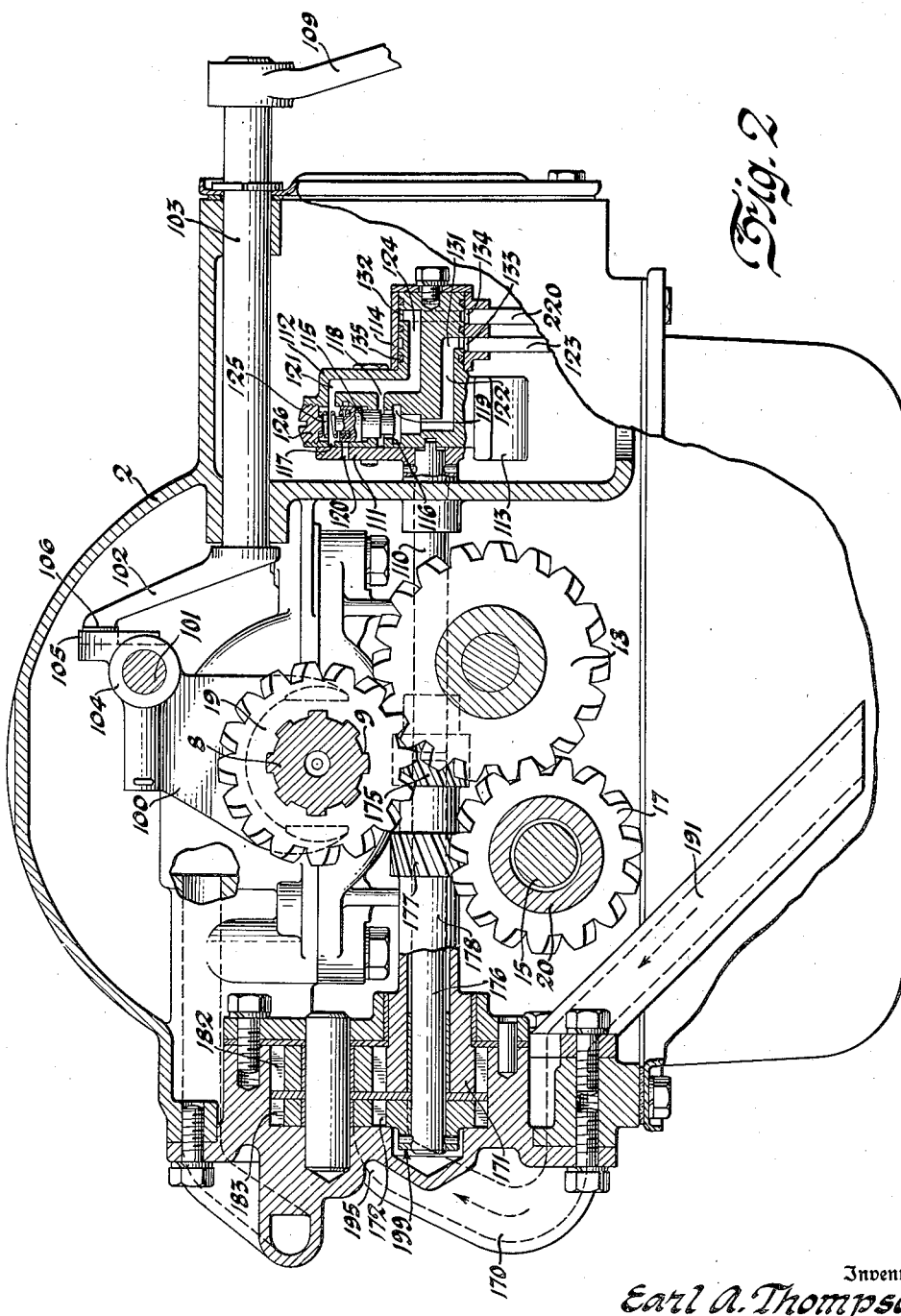
Figure 2 is a transverse vertical section at 2—2 of Figure 1, showing the servo pump assembly at the left and one form of governor at the right.
Figure 3:
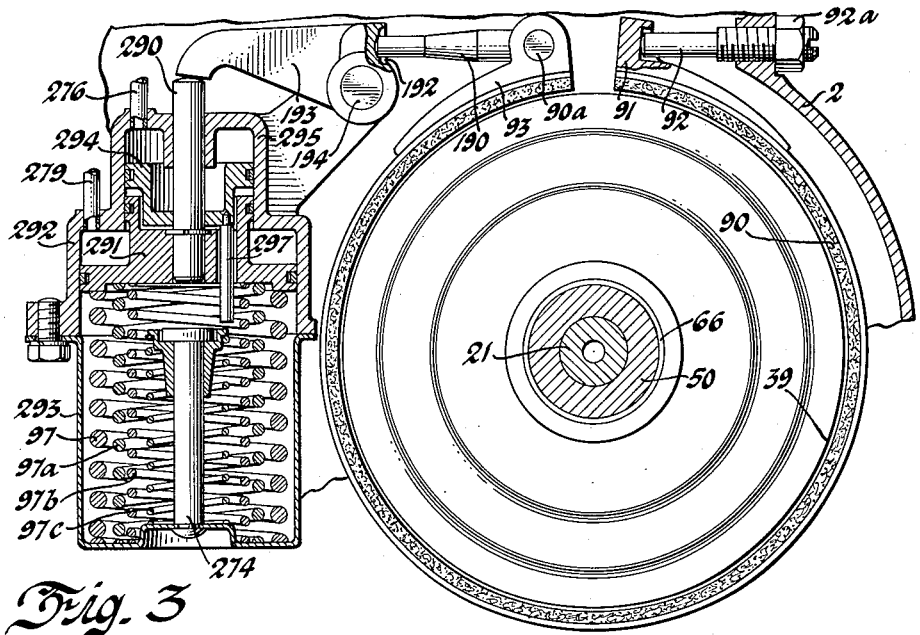
Figure 3 is a transverse section at 3—3 of Figure 1, the detail of the gears and clutch parts being omitted, the showing being directed to the actuation system.
Figure 3A:
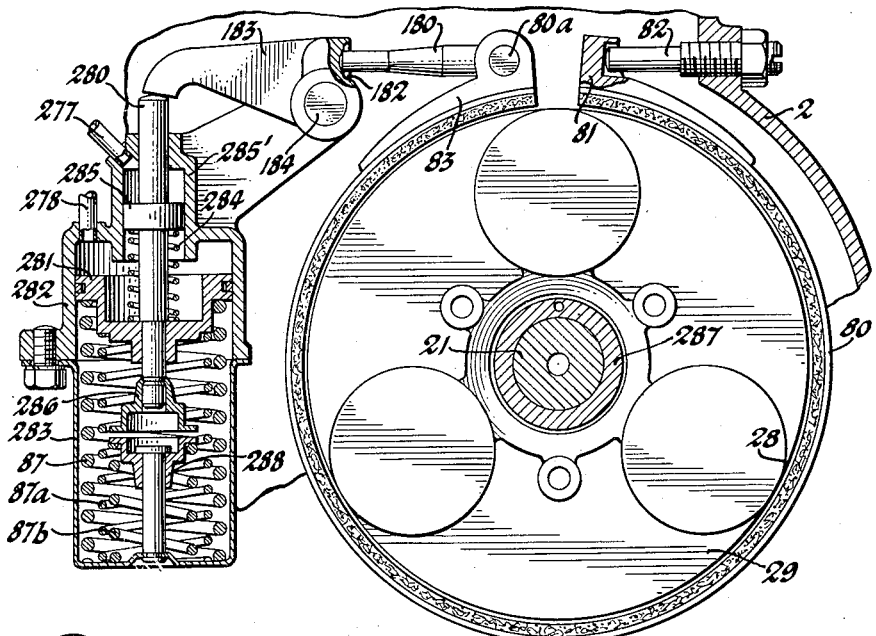
Figure 3a is similar to Figure 3 showing the parts of the actuator system for the front unit, at approximately 3a—3a of Figure 1.

Figure 4 is a schematic diagram including the pump and governor of Figure 2, the actuation system of Figures 1, 3, and 3a, and the auxiliary controls for coordinating the responses of the automatic and the manually moved elements providing a full automatic shift among the four available forward ratios. Figure 4a is a diagram of a camplate moved by the operator-controlled linkage of Figures 2 and 13 for controlling the lever 320 and valve 168 of Figure 4.

Figure 5 is a sectional view of a modified form of governor to that of Figure 2.

Figures 6 and 7 represent valve construction porting and details for an assembly of parts as shown in Figure 8.

Figure 8 is a schematic diagram including the servo pump of Figure 2, the two-stage hydraulic governor of Figure 5, the actuation system of Figures 3 and 3a, the compensator control of Figure 4 and the valve arrangements of Figures 6 and 7. Figure 8 also shows the pump regulating valve and the lubrication system connection.

Figure 9:
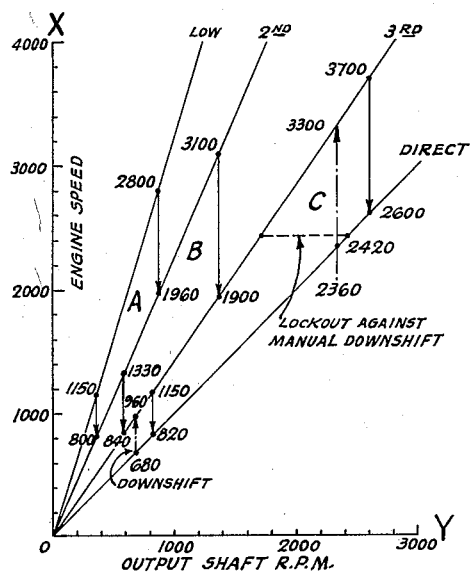

Figure 9 is a typical diagram of four forward speed ratios with upshift and downshift points given as examples of an application of my invention to a motor vehicle, wherein the arrows pointing downward refer to speeds of engine and output shafts for increasing transmission ratio, and the arrows pointing upward refer to downshift changes at the noted relative speeds.

Figure 10:
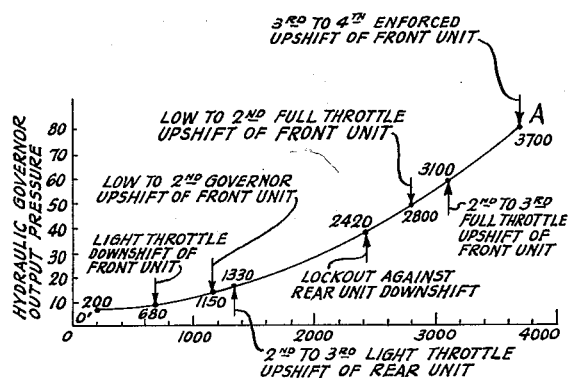

Figure 10 is a typical pressure response curve of the hydraulic governor of Figure 2, the marked points referring to the ratio control characteristics of Figure 9. Figures 9 and 10 studied together, show the coordination requirements for a typical shift pattern according to my invention, wherein the objectives noted preceding are obtained.

Figure 11:
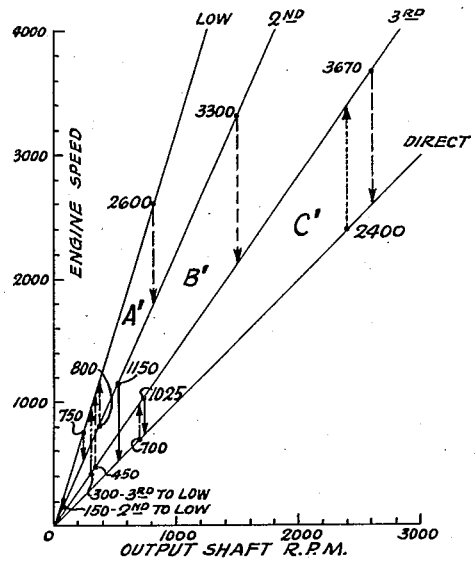
Figure 12:
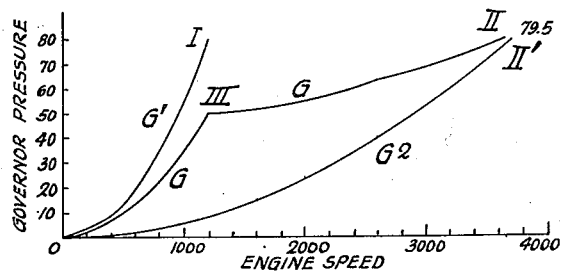

Figure 11 is a diagram similar to that of Figure 9, wherein the ratio shift points are taken at somewhat different relative speeds for the desired forward ratio changes, from those of Figure 9. These are coordinated to the two-stage pressure governor of Figure 5, the characteristic pressure curves of which, with respect to the control system of Figure 8, and the valve arrangement of Figures 6 and 7, are as shown in Figure 12. It will be noted that the curves G and G¹ are combined to yield the resultant curve G².

Figure 13 describes the lever system controlled by the operator's handlever for shifting the forward-reverse gearing of Figures 1 and 2, and the cam plate of Figure 4a, or the cam plate 212' for valve 168' of Figure 8.

In Figure 1, the general arrangement of the driving parts of the transmission assembly are shown with the engine-connected shaft 5 at the right carrying integral gear element 7. Between shaft 5 and the engine any standard form of clutch may be used. Shaft 5 is supported in the end wall of casing 2 at bearing 6, and in turn supports intermediate shaft 8 in pilot sleeve 69.

Shaft 8 terminates at the left in annulus drum 11, the hollow portion piloting shaft 21 in bushing 13. Splines 9 of shaft 8 mount sliding gear 19 which may mesh with the internal teeth 7' of gear 7, or with reverse idler gear 18.

Countershaft 15 is rigidly fixed between the endwall of casing 2 and web 4, and supports countershaft cluster gear body 20 on bushings 14, which receive oil from helical cuts 35 through drilled passages to be discussed later. Teeth 16 of body 20 constantly mesh with gear 7 so that body 20 runs at a fixed ratio to engine speed at all times. Teeth 17 of body 20 constantly mesh with idler gear 18. When gear 19 meshes with teeth 7' of gear 7, shaft 8 runs at engine speed; when 19 meshes with idler 18, shaft 8 runs reversely to shaft 5.

Gear 19 is moved along splines 9 by fork 100 attached to or integral with slider 104 of rod 101 fixed between web 4 and the end wall of casing 2. Shifter shaft 103 of Figure 2 extends in arm 102 to cam head 106 moving in the slides of shifter 104. Shaft 103 is rocked by external linkage attached to rocker arm 109 as will be described in detail later.

Gears 173 and 174 are fixed to body 20 and shaft 8 respectively, and drive the fuel servo pump assemblies to be described, the cross-shaft 176 carrying gear 175 meshing with gear 174.

The transmission output shaft 50 mounted in casing 2 at bearing 49 supports the rear end of shaft 21, its front end being supported as described preceding. Thrust bearings 10 and 47 locate shaft 21 with respect to shafts 8 and 50, respectively, and thrust bearing 10' transmits thrusts between shaft 8 and shaft 5.

Gear teeth 12 of drum 11 deliver input torque to planets 24 rotating on spindles 23 supported in carrier 22 rotating with shaft 21. Sun gear 25 also meshing with planets 24 is integral with sleeve 26 and drum 28 rotatably supported on shaft 21 through the sleeve of carrier 22, and reaction forces are taken through web 29 of drum 28, rotating with sleeve 26.

Extension 34 of carrier 22 is attached thereto by rivets 31, and is splined at 40 to support clutch plates 33 which mate with clutch plates 36 arranged to rotate with drum 28 by intersecting bolts 64. Internal seats 30 for springs 88 are formed on drum 28; presser plate 74 rotating with drum 28, and serving to sustain extension forces from springs 88.

Portion 29 of drum 28 is recessed at 71 to form cylinders for clutch pistons 72 and piston pins 73 arranged to coact with plate 74. Drilled passage 79 admits fluid pressure to cylinders 71 through porting to be described later. The step-ratio gearing herewith described is illustrative, and may be replaced by other forms, wherein the principle of having a predetermined minimum torque capacity available at all times is utilized, as will be described later.

When fluid pressure is exerted on pistons 72, springs 88 are compressed, plates 33—36 are loaded for a predetermined torque capacity, and the couple thus established requires gears 12—24—25 to rotate as a unit with the associated parts above described. When fluid pressure is released from cylinders 71, springs 88 expand, and drive is removed from plates 33—36. Brake 80 surrounding drum 28 may then lock the drum against rotation, and require carrier 22 and planet gears 24 to planetate around the non-rotating sun gear 25, through servo and control means to be described.

Two net speed ratios are therefore available between shafts 8 and 21 according to whether clutch 33—36 is driving or brake 80 is applied to drum 28.

The above describes the structure and operation of the so-called front unit of my example. Shaft 21, as the output shaft of the front unit, is the input shaft for the rear unit. Sun gears 37 and 38 are integral with or attached to shaft 21, and mesh with planet gears 43—44 respectively. Clutch hub 59 splined to rotate with shaft 21 is externally splined at 67 to mount clutch plates 60 corresponding to clutch plates 33 of the front unit.

A composite drum 39 bearing mounted on the sleeve of hub 59, provides braking surface for brake 90, and is further supported at bearing 66 on shaft 50. The drum 39 is attached to annulus gear 42, the web of which supports springs 89. Presser plate 78 mounted to rotate with drum 39 is bored to receive piston pin 77 which transmits force from piston 76 in cylinder 75, to plates 60 and to plates 55 arranged to rotate with drum 39. The clutch plates 55—60 are identical with plates 36—33 of the front unit; and are loaded by fluid pressure in drilled passage 79' similarly to the actuation method for the front unit.

Annulus gear 42 meshes with planet gears 44. Carrier 54 for planets 44 is attached to drum 52 having internal gear teeth 51 meshing with planet gears 43. Carrier 46 of planets 43 is integral with or attached to output shaft 50. When brake 90 is locked to drum 39, annulus gear 42 is held against rotation, and planetation of carrier 54 and planets 44 occurs, a predetermined speed component being applied to annulus 51. Simultaneously sun gear 37 is applying torque to carrier 46, and instead of a speed ratio derived solely from the gearing couple of 37—43—51, the net speed ratio of shaft 50 to shaft 21 is the resultant of the compounding of the motion of annulus 51 and sun gear 37 through planets 43 upon carrier 46. In the present instance this is a reduced forward speed ratio.

When clutch 55—60 is loaded by fluid pressure in cylinder 75 and brake 90 released, the couple thus established between shaft 21 and annulus 42 causes the assembly to rotate as a unit.

The above description of the so-called rear unit provides two net speed ratios, direct drive, and geared drive, so that with the front unit combination, the overall number of forward speeds available is four as will appear following.

In combining the preceding mechanism, it should be understood that I have associated two fundamentally different forms of planetary gearings in series for the deliberate purpose of obtaining the maximum number of properly distributed speed ratios. This is not possible with ordinary combinations of identical forms of gearings in that, for example, should there be two units such as my front unit serially connected between power and load, there would be only three net forward speeds, since their reduction ratios would be identical. The actuation means and method herein described may take other forms, it being only essential that loading of friction elements engaged or sustained by fluid pressure and unloading of the friction elements constituting the torque carrying or sustaining means be likewise fluid pressure operated.

I, therefore, by utilizing dissimilar planetary forms in two-speed series arrangement, obtain a proper distribution of speed ratios available over an approximate uniform range, not otherwise available in compounded series gearing of this type.

The following table will make clear the ratios derived:

|  | Front unit | Rear unit | Ratio |
| --- | --- | --- | --- |
| Low | Reduction | Reduction | 3.17 |
| 2nd | Direct | do | *2.23 |
| 3rd | Reduction | Direct | **1.42 |
| Direct | Direct | do | 1.00 |

\*Speed ratio of rear unit.
\*\*Speed ratio of front unit.

In a series gear arrangement of this type the product of the individual reduction ratios is equal to the overall reduction through both units.

In the view of Figure 2, the forward and reverse shifter arm 109 rocks shaft 103, arm 102 and cam head 106 in slides 105 of shifter 104 which slides on rod 101, moving gear 19 as described. Gear 175 driven by gear 174 of Figure 1 drives shaft 176 and pump rotor 172, the meshing stator gear 183 of pump assembly 199, driven by movement of the vehicle. Countershaft body 20 and gear 173 drive gear 177, hollow shaft 178 and pump rotor 171, with which mating stator gear 182, the primary group of the pump assembly 199 is found. The latter is subject to engine speed rotation.

The stator gears 183 and 182 are spindled in the housing, and sump suction pipes 191 and 170 feed to suction space 195 for both units. The pressure outlets of the double pump assembly are shown schematically in Figure 4. The normal directions of rotation of both rotors 172 and 171 is such as to add the resultant pump pressures, but when drive is in reverse, it will be seen from inspection of Figure 2 that rotor 172 will run backward, therefore the lower capacity for this unit as compared with the 171—182 unit. In this event, the subtraction, or loss of pressure is not sufficient to prevent positive pressure output from the pump assemblies.

Small gear 175 which drives shaft 176 also drives governor shaft 110 pinned to the flange 111 of the hydraulic governor shown at the right in Figure 2. Flange 111 is attached to governor body 112, which has counterweight portion 113, and is carried at the outer end in gland 114.

The gear 182 (Fig. 2) is driven by meshing gear 171 of hollow shaft gear 177. The latter meshes with gear 178 fixed to countershaft body 20 constantly geared through 16—7 to input shaft 5 which runs at engine speed. This carries the speed index of the engine to gear 182.

Gear 183 is driven by meshing pump gear 172 and shaft 110, which latter receives drive through gears 175, 174 and shaft 8. Since rotation of shaft 50 is carried back to shaft 8 through the two units, in which there is never an interruption of torque, the pump unit 172—183 always yields pressure, even if 19—7' be disconnected, whenever shaft 50 has rotation.

Valve 115 moves in the bore sections 116 of body 112, its portings 117, 118, 119 and 120 being connected through drilled passages 121, 122 to outlet pipe 123 receiving oil from pump manifold 200 of Figure 4 and to pipe 220 which delivers modified pressures to the servo control units of Figure 4.

When forward drive is established by meshing of gear 19 with gear teeth 7' of Figure 1, the governor partakes of engine speed, by means of the intervening gearing described. The governor may be said to be a hydraulic one in that it delivers a governed pressure according to changes in speed.

In detail, the governor device of Figures 2 and 4 consists of body 112 in which two externally connected passages 122 and 124 are drilled, the first being joined by piping 123 to the pressure main 200 of the servo and lubrication pump 199 of Figure 2, the second to governor output line 220.

The body 112 is radially bored at 116 to accommodate valve member 115, which is normally held by spring 125 retained by slotted screw cap 126.

The bore ports in order radially from the rotation center of the casing, are the inlet port 119, the servo port 118, the exhaust port 120, and the control port 117. Inlet port 119 connects to oil pump lead 122. Servo port 118 of bore 116 has two outlets, one leading to the governor output line 124, and the other consisting of drilled passage 121 leading to control port 117. The exhaust port 120 dumps overpressure from excess lift of valve 115 through the outlet shown.

Valve 115 at its outer end is formed into stop boss 128 adjacent large diameter boss 115b. Below 115b is smaller diameter boss 115a, the inner end of the valve 115 being formed into a small diameter boss 115c which fits the smaller part of bore 116. See Figures 2 and 4.

The hydraulic governor casing consists of a cast body 112 attached to flange 111, pinned to governor shaft 110 of Figure 2. The outer sleeve end of the casing 112 is drilled radially at 131 and 132 extending fluid pressure leads 122 and 124 to match with passages 133 and 134 in gland 114 which connect to pipes 123 and 220 respectively.

The body is formed into a counterweight 113 to balance the mass of the rotating assembly. Sealing rings 135 prevent linkage of oil from gland 114, at the bore.

The hydraulic governor as a controlling pressure regulator operates through the interaction of pressures on the faces of bosses 115a and 115b of valve 115, and through the centrifugal force on valve 115 working against spring 125, these forces being arranged by design to yield a net output pressure curve such as line O'—A of Figure 10. This is an approximate square-law curve, in which the modifying forces establish a series of consecutive pressures which may constitute an approximate straight line function, if such be desired. Heretofore, in speed ratio control devices of this general type, the problem of establishing a full scale operation over a wide range of speed used to index the desired governor effect, has not been met, to my knowledge, by means of providing selective operation characteristics such as afforded by my device.

The diagram in Figure 10 is of especial value in focusing attention on the unique characteristics of my hydraulic governor. By providing a scale of distributed pressures at which the various speed ratio shift functions may take place, the equilibrating of the servo control devices to those selected pressures for the given functions is simple, and exact within commercial requirements.

For example, the following table of selected pressures delivered by the pump represents the predetermined shift characteristics desired, for advanced or retarded throttle:

| Governor output pressures | At eng. R. P. M. | Throttle setting | Shift effects required | |
|---|---|---|---|---|
| | | | Front unit | Rear unit |
| 6 | 200 | | (Downshift below 200 R. P. M.) | |
| 8 | 680 | Ret | Downshift | |
| 13 | 1150 | Ret | Upshift | |
| 15.6 | 1330 | Ret | | Upshift. |
| 37 | 2420 | | (Prevention manual downshift 3rd or 4th to 2nd or 3rd) | |
| 49 | 2800 | Adv | Upshift | |
| 58 | 3100 | Adv | | Upshift. |
| 80 | 3700 | | Upshift | |

The review of the disclosure in Figure 4 now to be described will make clear how the above table is applied.

Figure 3 is a cross-section view of the actuation arrangement of the brake and brake cylinder assembly for the rear unit. In this figure, brake drum 39 may be gripped by band 90 anchored at fitting 91 in housing 2, by adjustable stud 92 and nut 92a. The movable end 93 of band 90 carries pivot 90a for thrust rod 190 fitting notch 192 of rocker 193 pivoted at 194 and actuated by piston rod 290.

Brake cylinder 292 is attached to, or integral with casing 2, and has bolted spring retainer cup 293.

The details of the elements inside of cylinder 292 are now given. Piston 291 slides in the cylinder, and is attached to rod 290. Springs 97, 97a, 97b, press the piston upwards, tending to apply brake 90. Compensator piston 294 slides in the smaller section 295 of the cylinder 292, and rides on the rod 290. Compensator pressure line 276 connects to cylinder section 295, and servo pressure line 279 leads to cylinder 292 so as to act upon piston 291 alone. Abutment 274 held by spring 97c and sliding on a guide extension of spring retainer 293 may be struck by pin 297 attached to piston 294, but free to move in a drilled passage in piston 291. Pressure in 295 may be exerted on piston 294, compensating the action of the resistance of the springs 97, 97a and 97b on line pressure in 279, as will be described further. The actuation system described herewith is especially adapted to provide an overlapping torque effect during change of ratio, so that a constant minimum torque value is maintained between input and output shafts for reasons to be described in detail later in this specification. The spring arrangements provide stored energy utilized in both control of loading and regulation of the rates of loading and unloading as will be seen.

Figure 3a is a cross section view of the brake and brake actuating assembly for the front unit. Brake drum 28 may be gripped by band 80 anchored at 81 in casing 2 by stud 82. The movable end 83 of band 80 carries pivot 80a for thrust rod 180 fitting notch 182 of rocker 183 pivoted at 184, and actuated by piston rod 280.

Brake cylinder 282 is attached to, or integral with casing 2, and has bolted spring retainer cup 283.

Piston 281 slides in cylinder 282, and on rod 280, and is engageable by abutment 286 fixed to the rod, and by springs 87 and 87a, which tend to apply brake 80 of the front unit through the above linkage. An abutment 288 sliding on a guide extension of retainer 283, is held by spring 87b, and may strike abutment 286.

Compensator piston 285 slides in the cylinder section 285′ of 282 and is attached to rod 280. Spring 284 may transfer a given force from downward motion of 280 and 285 to piston 281. Pressure from compensator line 277 may be exerted in 285′, compensating the action of the resistance of the springs 87 and 87a on line pressure in line 278 connected to cylinder 282, and arranged to remove the load of springs 87 and 87a, while applying the clutch 33—36 of Figure 1 as will be described later.

Having described the various group units, and how they operate within themselves, this text will now trace the interconnections among the groups, including the coordinated action of the control elements by which predetermined variations in torque capacity of the driving elements are obtained during the shift intervals, for maximum smoothness and avoidance of shock effects.

Figure 13 gives a conventional linkage of hand-lever 151 attached to shaft 153 rotating arm 154 to reciprocate link 155 to rock lever 109 for shifting the gearing for forward and reverse, and to rock shaft 310b and camplate 212 or its equivalent 212′, through lever 310a.

The pump being driven as indicated in Figure 2 produces line pressure in manifold 200, which is delivered to line 238—232 to the rear unit control valve port 324, line 238—233 to the input port 243 of the differential valve 240, line 123 to the input port 119 of the hydraulic governor, and through line 234 to the input port 266 of the actuating valve 150 for the front unit.

Whenever the engine or the vehicle, or both are in motion, pump manifold 200 delivers fluid pressure to all of these points.

The hydraulic governor outlet pressure in Figure 4 is carried in line 220 to both control cylinders 300 and 400 for both units, and through connection 222 to port 218 of plunger 215.

Referring to Figure 4a, valve 168 of Figure 4 is rocked by bell-crank 320 between positions registering ports 324 and 325 or ports 325 and 326 as previously described.

When the camplate 212 of Figure 4a is in either of the "reverse" or "low" positions, pin 211 in slot 213 is rocked counterclockwise, forcing valve 168 to occupy the "down" position.

When the camplate 212 is in "neutral," the valve 168 by reason of the contouring of slot 213, is compelled to shift clockwise, putting the valve in the "up" position, or such that pump pressure may flow to cylinder 292 of the rear unit and to clutch line 79′.

In order to enable the driver to shift from direct drive in the rear unit, to 2nd speed, that is, to lock the brake 90 on drum 39, rod 214 and plunger 215 in bore 216 held down by spring 217, abuts lever 320, for exerting an upward thrust when fluid pressure from the governor through line 222 is capable of overcoming spring 217, aided by fluid pressure in port 218, delivered from line 272', connected to the servo cylinder line of the rear unit, and acting on plunger 219.

This can only take place, however, at pressures corresponding to governor speeds of approximately 2000 R. P. M., so that the operator cannot abuse the engine by making a manual downshift to 2nd speed, when the higher governor and engine speed ranges are in force.

Connections 220a and 220b join line 220 to cylinders 300 and 400 respectively.

Line 272 carries pressure from port 325 of valve 168 to the clutch cylinders 75 of the rear unit, and also to cylinder 292 and to piston 291, as in Figure 3.

Differential valve 240 meters pressure received from pump passage 238 to compensator line 277, joined to piping 277' to compensator cylinders 285' and 295 of both units. Line 277 is also connected to servo control cylinders 400 and 300 through connections 228 and 229 respectively.

Line 278 leading from port 267 of valve 150, delivers fluid pressure to clutch cylinders 71 and pistons 72 of the front unit, as well as to brake cylinder 282.

The servo control cylinder 300 for the rear unit is ported at 430 with connected piping 431 therefrom to port 432 of servo control cylinder 400 for the front unit, through pipe extension 431, and line 272—431 joins both ports 430 and 432 to actuator cylinder 292 for the rear unit.

Figure 4 shows the pedal connected rod 361 attached to lever 143 through an adjustable clevis. Lever 143 is mounted on shaft 144 rotatable in the cover plate (not shown) bolted to casing 2, and inside the cover plate, the lever 145 is mounted to swing with shaft 144 as the rod 361 is reciprocated.

Lever 145 is formed with a cam end, and at its opposite end is formed with eyelet 127 arranged to intersect stop pin 129 which limits the travel of the assembly of throttle pedal connected parts thus far described.

The extension 321 of valve 240 locates metering spring 322 which presses plunger sleeve 323 intersecting the cam end of lever 145. Sleeve 323 is arranged to transfer force to valve 240 entirely through spring 322 for part of its travel upward, and thereafter to act upon extension 321 of valve 240 directly.

The diagram of parts in Figure 4 describes the complete servo control and servo actuation system. Attention is directed to the fact that the servo control units act as pressure regulators for the actuator units.

For convenience in following the paths of fluid pressure through the various channels, the element groups will first be defined. The double pump assembly, designated by numeral 199, is as described in Figure 2, the servo system outlet casing or manifold 200 delivering pump pressure to the hydraulic governor valve 115, the differential valve 240, the front unit valve 150, the rear unit valve 168, and from these valves the controlled pressures are delivered to the servo control and actuation members.

The assembly of the servo control cylinder 300 regulates the operation of valve 168 which controls the actuation of the rear unit of Figure 1 through pressures in clutch cylinders 75 and brake cylinder 292. The assembly of the servo control cylinder 400 governs the operation of valve 150 which controls the actuation of the front unit of Figure 1 through pressures in clutch cylinders 71 and brake cylinder 282.

Force applied to toggle arm 304 by rod 303, positions servo valve 168 in either of two positions; admission of fluid pressure from line 238 to the brake servo cylinder 292 and clutch cylinders 75, at port 325 shown in Figure 4, or release of pressure from port 325 and the cylinders 75—292 to exhaust, through port 326.

The servo control arrangement for the front unit consists of cylinder 400 having two bore sections 401 and 402, in which pistons 403 and 404 may slide. Piston 403 is attached or integral with control rod 405; and piston 404 is integral with secondary piston 406, sliding in sub-cylinder 407. Spring 409 normally acts to hold piston 403 to the left, and spring 411 acts on sliding abutment 410 to hold it flush with shoulder 412 of cylinder 400.

The throttle connected valve control of Figure 4 consists of a valve member 240 occupying bore 241 in valve housing 210, having oil pump connected port 243, reaction port 242, output connected port 244 and exhaust porting 245. This assembly comprises the throttle pedal means for establishing the operation of the speed ratio control devices of Figures 3 and 3a.

Figure 4 provides also a schematic representation of the servo control on the valving for both the front and rear units, controlling the servo actuation of the clutches and brakes of the said units.

Servo control cylinder 300 for the rear unit contains piston 301 working in bore 302 adjacent bore 305. The piston 301 is rigidly attached to control rod 303 pivoted at 306 to toggle arm 304. Spring 307 normally presses piston 301 to the right of bore 302, and spring 309 presses sliding abutment 310 against shoulder 311 of cylinder 300. At the right, web 308 of cylinder 300 sets off a second compartment 312, in which piston 313 abuts rod 303a.

Toggle arms 303 and 304 pivoted to the casing 210 at 315, act together through attached snap spring 316. Toggle arm 303 is pinned to link 317, which in turn is pivoted to valve rocker arm 320 at 319. Rocker 320, pivoted to the casing 210 at 321 is attached at 321' to the master valve 168 for the rear unit, sliding in bore 330, ported at 324, 325 and 326. Port 325 is connected to the actuator cylinders 75 for clutch 55—60 of the rear unit and cylinder 292 for the operation of the brake 90 of Figure 3. Port 324 connects through pipe 238 to pump manifold 200. Port 326 is for exhaust. Valve 168 in the "up" position joins ports 325—324 supplying pump pressure to actuate clutch 55—60 of the rear unit, and take off brake 90 of that unit. In the "down" position, valve 168 relieves the pressure causing clutch 55—60 to disengage, permitting brake 90 to be applied, sealing off pump port 324.

With advance of the engine throttle pedal 141, rod 361 rocks lever 143, shaft 144 and lever 145 counterclockwise, delivering an increasing stress to spring 322. This applies an upward pressure on valve 240 tending to close off fluid in port 243 from port 244. As the pedal is retracted, the port opening is increased, permitting greater flow between the pump line 238 and compensator line 277.

The hydraulic governor assembly of Figures 2 and 4 provides a novel method for obtaining a wide range of control functions to meet the requirements for motor car speed ratio control.

The radial movement of valve 115 from the shaft center is conditioned by centrifugal force of rotation of shaft 110 on the valve 115 as opposed by spring 125, and by pressure conditions in passages 122 and 124. The valve is ported to achieve a metering pressure control effect proportional to speed of shaft 110, as will be discussed following. Depending upon the dimensions and force in spring 125, the output pressure curve may be made to approximate the square of the applied speed, or to assume correlative values to correspond to the shift requirements of the fluid pressure control system departing somewhat from the square law, as is found expedient.

The exposed end area of the lower boss 115a to pump line pressure from manifold 200 is smaller than the exposed area of the upper boss 115b, therefore, when shaft speed is low and pump pressure just building up, the initial movement of valve 115 is more rapid than in the immediately following stage when not only is a larger area exposed, but also the resistance of spring 125 is greater.

When port 118 is open to line pressure from 122 through 119 and, by lifting of valve 115, the exposure of the top of the valve to pressure from passage 121 to port 117 tends to hold the valve 115 stable at a given radial distance from the shaft center, while applied speed and pressure conditions remain within predetermined limits.

At the lowest speed, 200 R. P. M., it is desirable that the pressure from the pump assembly diminish to a point below which both front and rear units will be in their reduction speed ratios. Assuming forward acceleration of the vehicle by opening of the engine throttle, the governor output pressure will rise to 13 pounds at 1150 R. P. M. as shown in the chart in Figure 10, when the piston 403 of Figure 4 will move against spring 409. At light throttle, valve 240 will be permitting full compensating pressure in passage 277 so that piston 404 will not interfere with movement of rod 405, and toggle 415—416 will snap valve 150 to the right, admitting servo pressure to clutch cylinders 71 and brake cylinder 282 of the front unit.

This will establish shift to "direct" in the front unit, which by the table of ratios, is "2nd" speed ratio.

At 2800 R. P. M., and 49 pounds pressure on the curve of Figure 10, the full throttle action has moved valve 240 of Figure 4 to shut-off position so that there is no pressure acting to hold out piston 404. Line pressure in 220 must therefore be sufficient to overcome springs 409 and 410 and move piston 404 out of the way. Spring 411 is so positioned that it cannot move piston 403 far enough to the left to produce a downshift. At this pressure point the front unit will shift to its "direct" or to "2nd" speed ratio, even if the throttle pedal has been held in fully depressed position.

Between these two pressure-speed points, the variation of engine throttle and engine speed interact so that up-shift may occur at an infinite number of points between.

This relationship is also shown in the graph of Figure 9.

After the shift to 2nd speed ratio has been made, the front unit is in direct; but the rear unit is required to shift "up" to direct, with a shift in the front unit to reduction gear, in order to obtain 3rd speed ratio.

When the governor delivers sufficient pressure, such as at 1330 R. P. M., augmented by compensating pressure on 313, the net pressure acts on piston 301, overcomes springs 307—309 shifting 303 to the left, snapping toggle 303a—304, putting the rear unit in direct drive, under light throttle conditions.

If engine speed after the above shift occurs is below the downshift point (680 R. P. M.) for the front unit, that unit will be downshifted by spring 409 overcoming the governor delivered pressure, giving 3rd speed ratio.

But if engine speed after the shift is greater than 680 R. P. M., the transmission is in 4th speed under light throttle conditions.

Full throttle shift from 2nd to 3rd speed is obtained at 3100 R. P. M., when there is sufficient governor pressure to overcome springs 307 and 309 without compensation pressure on 313.

When the rear unit shifts, the rear unit servo pressure acts on piston 406 of the front unit servo control, sufficient to augment spring 409 and produce downshift of the front unit.

However, the ratio will remain in 3rd at full throttle until a governor speed of 3700 R. P. M. is reached, when governor pressure is sufficient to overcome springs 409—411 and the rear unit pressure on piston 406.

In the examination of the ratio shift chart of Figure 9 it must be appreciated that the straight lines radiating from the origin representing net speed ratios between transmission input and output shafts, proportioned in slope according to the gear diameters and center distances in the example. The slopes of the lines will vary according to selected speed ratios, and are not limited to the exact ratios used herewith.

The ratio pattern is herein repeated for demonstration purposes:

Low _____ 3.17
2nd _____ 2.23
3rd _____ 1.42
Direct _____ 1.00 the numbers referring net input speed to output speed of 1.

The "low" and "2nd" lines on the chart encompass an area A between engine speeds of 1150 to 2800 and 800 and 1960 respectively.

The shift pattern of Figure 9 is laid out to show engine speed on the OX scale and transmission output shaft speed on the OY axis. The four lines radiating from O and marked respectively "low," "2nd," "3rd" and "direct" represent the available speed ratios given as examples in the foregoing description.

The diagram of Figure 10 represents a typical set of control characteristics afforded by my hydraulic governor arrangement. The vertical scale represents net output pressures provided in passage 124 leading from the governor of Figure 4 to the servo control system of the figure; and the horizontal scale represents net engine speeds. The curved line beginning at 200 R. P. M., engine speed and 6 pounds pressure, and engine at 3700 R. P. M. and 80 pounds pressure, is a representative pressure curve derived from the hydraulic governor of my invention.

The form of hydraulic governor shown in Figure 5 consists of a rotatable valve body 112' attached to shaft 110' driven by gear 175, and spindled in gland 114' which has a running fit with the rightward extension of the body 112'.

Two valves 115' and 111' occupy bores 116' and 113' respectively, the bores being open to exhaust at their outer ends. Valve 115' has bosses 121' and 122' in sequence from the centerline outward, the boss 121' fitting a wider portion of the bore 116'. Boss 122' terminates in weight 123', to be referred to as W² in this specification.

Valve 111' has bosses 125' and 126' in sequence outward from the centerline, the boss 125' fitting a wider portion of bore 113'. The extension of boss 126' constitutes a weight member 124', to be referred to as W¹ in this specification.

A central vent port 120' for bosses 121' and 125' is drilled into valve 112' at 127', the lead opening to the sump 231 or the suction side of the pump assembly 199.

The lowermost port 117' connects by passage 118' to port 119' open to the upper face of boss 115' and to the lower face of boss 121', both ports connecting in turn to passage 124' and annular ring 128', cut on the extension of body 112'.

The uppermost port 129' connects with port 130' by passage 131', the port 130' being exposed to the upper face of boss 125' and the lower face of boss 126', both ports 129' and 130' being connected by passage 132' to annulus 133' cut in the extension of casing 112'.

Pressure ports 134' and 135' for each of the valves 111' and 115' are cross-connected by passage 136' leading to annulus 137' cut in the extension of casing 112'.

Annulus 128' is in register with line 138'; annulus 133' is in register with line 139' and annulus 137' with line 140', the lines leading from fixed gland 114' to the servo and control elements of Figures 6 and 7.

It will be observed that W¹ is a larger weight than W² and by the well-known centrifugal effect, valve 111' upon a given increase in rotation will first tend to move radially from the position shown.

Assuming a constant pump pressure in line 140' and ports 134' and 135', the opening of port 135' is caused by centrifugal force shifting the valve 111' so that port 131' intersects the lower edge of boss 126', and permits metered pressure to be exerted on the upper face of boss 125' and on the lower face of boss 126', and because of the dissimilarity in the areas of the bosses, the net metered pressure acting together with the centrifugal effect tends to reach an equilibrium point corresponding to a given speed of rotation of body 112'.

At this equilibrium position, the lower face of boss 126' tends to restrict the flow from port 135' to port 130' by a given amount, so that the net pressure existing in passage 132' and line 139', to supply a given degree of control, such as G¹, will depend primarily upon the factor of governor body rotational speed, as modified by the differential area pressure factors of bosses 125' and 126'.

The curve O—I of Figure 12 shows a series of pressures for given governor speeds, corresponding to the effect of valve and weight action as provided by the above noted interacting pressure and centrifugal force mechanism.

The centrifugal and pressure effect noted above is also utilized in the operation of valve 115'. As centrifugal force on valve 115' and weight 123' increases, the opening of port 134' by passage of the upper edge of boss 122', permits pump line pressure to be exerted on the lower face of boss 121' and on the upper face of boss 122', and because of the dissimilar areas of the bosses, the metered pressure acting together with the centrifugal effect, tends to reach an equilibrium point corresponding to a given speed of rotation of body 112'.

At this position, the upper face of boss 122' tends to restrict the flow from port 134' to port 119' by a given amount, so that the net pressure existing in passage 124' and line 138', to supply a given requirement, such as G², will depend upon the factor of governor speed, as modified by the differential area pressure factors of bosses 121' and 122'. The curve O—II' of Figure 12 shows a series of pressures developed by valve 115' in the output pressure passages connected thereto.

It is assumed that normally constant leakages are experienced in the passages beyond lines 138' and 139' wherein the speed effects of the governor are to be utilized. Excessive pressure caused by blocking of either of the lines is automatically taken care of by the bosses 121' and 125', which being of larger areas than bosses 122' and 126', force the valves inward toward the centerline until the external exhaust stems 141' and 142' relieve the excess, whereupon the designed pressure for a given speed of body 112' will be resumed.

Fluctuations in pump pressure in line 140' are taken care of by valve 350 of Figure 4. If not so handled, the differential-area pressure tending to move valve 115' against centrifugal force, for example, remains the same, since the metering by boss 122' of the line pressure from passage 136' and port 134' allows the valve to feel output or metered pressure only. A loss of pump pressure would only determine the maximum operating pressure of the governor at a lower level.

In Figure 8 the pump pressure regulating valve 350, in a bore of casing 2, receives pump pressure in ports 352 and 353 from pump pressure outlet 354, and delivers uniform line pressure to leads 332 and 238 through check valve 355, and port 356. Overpressure port 357 dumps back to the sump at high pump speeds, as controlled by spring 358, whose tension is adjustable by nut 359. Port 368 and line 369 feed the lubrication inlet 27 of Figure 1 through passage 41 in shaft 8, and a similar passage in shaft 21. At given pressure conditions, lines 273, 276, 238 and 332 may drain back to sump through line 369, when the valve 350 is in the position shown.

In deriving curves O—I and O—II' of Figure 11, the net pressure effect upon the output system moved thereby must be considered along with the areas and derived pressures of valves 115' and 111', in that a parallel combining of forces on the output system can be made to yield a considerable family of resultant curves, typified by O—III—II of Figure 11. This will be clearer when the dissimilar areas of plungers 531—533 and 501—503 are considered.

The two control valve groups in Figures 6 and 7 are displaced, as shown in Figure 8 in the casing 500, the group to the left being for the control of the rear unit, and that to the right for the front unit.

The uppermost plunger 501 at the right is open to port 502 connected to line 139' of Figure 8, receiving pressure from the primary pressure stage G¹ of the hydraulic governor of that figure.

The adjacent abutting plunger 503 is open to port 504 connected to line 138' of Figure 8, and receives pressure from the secondary pressure stage G² of the governor. The bore 505 is open to exhaust at 506.

The front unit control valve 510 sliding in bore 509 of casing 500 has an upper boss 507 and a lower boss 508. Spacer pin 511 in drilled hole 512 transmits the force of plungers 501 and 503 to valve 510, abutting boss 507, which at its upper end is open to port 513 connected to servo line 278 of Figure 7.

The interspace between bosses 507 and 508 is shown as open to port 514 connecting to line 273 of Figure 8, joined to pump main 238, and open to port 515 connected to line 278 of Figure 8, joined to cylinder 282 and to line 79 of the clutch actuation system of the front unit.

Intermediate the ports 513 and 515 is exhaust port 516 open to sump drainage. The lower end of boss 508 is open to exhaust at 517, and abuts pin 518 sliding in drilling 519, which pin in turn transmits effort to plunger 520, open at its upper end to port 521 connected to compensator line 276' of Figure 8, and at its lower end to exhaust at 522.

Plunger 520 abuts plunger 523 whose upper face is open to exhaust at 522, and whose lower end is open to port 524 connected to pump line 273 of Figure 8.

Spacer pin 525 sliding in drilling 526 bears on the lowermost plunger 530 whose upper face is open to exhaust port 527, and whose lower face is exposed to port 528 connected to line 273', rear unit servo, of Figure 8.

The valve group at the left of Figure 6 will now be described. The uppermost plunger 531 is open to port 532 connected to line 139' of Figure 8, receiving pressure from the primary pressure stage $G^1$ of the governor.

The adjacent abutting plunger 533 is open to port 534 connected to line 138' of Figure 8 and receives pressure from the secondary pressure stage of $G^2$ of the governor. The bore 535 is open to exhaust at 536.

The rear unit control valve 540 sliding in bore 537 of casing 500, has upper boss 538, lower boss 539, and skirt 541. Spacer pin 542 in drilled hole 543 transmits the forces of plungers 531 and 533 to valve 540, abutting boss 538, which is open to port 544 connecting to rear unit servo line 272 of Figure 8.

The interspace between bosses 538 and 539 is shown as open to port 545 connecting to pump line 273 of Figure 8 joined to pump main 238; and open to port 546 connected to rear unit servo line 272 of Figure 7, joined to cylinder 292 and to line 79' of the clutch actuation system of the rear unit. The lower face of boss 539 is open to port 547 connected to pump line 273 of Figure 8. Bore 548 encloses spring 550, which presses control valve 540 upward, with a given force, for reasons to be described later. Intermediate port 549 between ports 544 and 546 is open to exhaust.

The lower end of skirt 541 of control valve 540 engages spacer pin 551 sliding in drilling 552 and casing 500. The pin projects into port 553 engaging the upper end of plunger 554, the port being connected to line 272 of Figure 8. The bore 555 of plunger 554 is open to exhaust at space 556, and engages spacer pin 557 sliding in drilling 558, and pressing on plunger 560, whose upper face is exposed to port 559 connected to compensator line 276 of Figure 8 for the purpose of delivering throttle controlled pressure to plunger 560.

The lower face of plunger 560 is exposed to port 561 connected to pump pressure line 273 of Figure 8. Spacer pin 562 connects plunger 560 mechanically with the lowermost plunger 565, the upper face of which is open to exhaust port 564, and the lower face of which is open to port 563 connected to line 341 of Figure 8, the line being controlled by the movement of manual valve 168', as shown in Figure 8.

The schematic diagram of Figure 8 describes the essential controls for the two stage governor ratio selection system combined with the regulatory means for predetermining a clutch control in each of the front and rear units.

The governor assembly is shown in outline in the upper left portion of the drawing, the gland 114' having three connecting lines, the first of which, 140', is connected to the pump main 238; the second of which, 139', delivers primary pressure output from the governor; and the third of which, 138', delivers secondary pressure output from the governor.

The details of the construction of the governor are shown separately in Figure 5.

The pump 199 schematically described in the lower left portion of the drawing, as has been explained, continuously operates as long as either of the engine or the output shaft of the transmission assembly are being driven. The suction line 190 connects to the sump of the transmission and the outlet pressure main 238 delivers to lines 238, 332, and 273. Line 273, as will be described, delivers pump pressure for servo actuation for both the front and the rear units of the assembly to front unit control valve 510 and rear unit control valve 540. Line 332 supplies pressure to compensator valve 240, which in turn provides compensation pressure for both units, so that the clutch capacities thereof may be controlled in accordance with motion of accelerator pedal. Line 140' obtains pressure from main 238 through manual control valve 168'.

The regulation of the torque capacities of the friction elements so that the driving mechanism will be prepared for operator-determined changes in torque demand, and also for changes in the driving conditions, is an essential feature of my invention. The metered output pressure of valve 240 accomplishes this result.

Compensator valve 240 shown schematically in the lower center portion of the drawing has been described in detail in Figure 4. Line 332 from the pump main 238 is opened to port 264, its pressure being permitted to pass through bore 339' to port 335, and thence to lines 276 and 276' leading to the compensation system.

The manual control valve 168' shown in diagram in the left center portion of the drawing receives pump pressure from main line 238 delivered to port 263 of bore 339. The adjacent port 262 delivers pressure to the governor inlet 140' and the lowermost port 340' may deliver pressure to line 341' leading to port 563 of the rear unit control valve system described in detail in Figure 6. The control valving for the rear unit shown in the approximate center of the drawing is also described in detail in Figure 6. Ported passages 545, 547, and 561 are joined to line 273 connected to pump main 238; and ported passages 544, 546, and 553, are connected to line 272 leading to the rear unit cylinder 292 and to line 79' connected to gland 287, which supplies fluid pressure to the clutch cylinder 75 of the rear unit shown in Figure 3. Side connection 273' from line 273 is connected to port 528 of the front unit valve assembly of Figure 7.

Compensator porting 559 of the valve control for the rear unit is connected to line 276 leading to port 335 of compensator valve 240; and likewise to line 276' leading to port 521 of the valve assembly for the front unit control shown in detail in Figure 6.

Ports 514 and 524 are connected to line 273 connected to the pump pressure main 238. Likewise ported passages 513 and 515 connect to the servo pressure line 278 for the front unit cylinder. Passage 278 leads to gland 287 of Figure 1 and through porting 79 to the cylinders 71 for the clutch pistons of the front unit, shown in Figure 3.

In the following discussion of the operation of the preceding mechanism, for convenience, the pressures from the primary stage of the governor in line 139' will be referred to as $G^1$, and from the secondary stage as $G^2$. The summation of these will be noted as G.

The output pressures from valve 240 in lines 277 of Figure 4 will be referred to as C, since the compensation pressures coacting with the valving controls are of identical nature. Line pressure from the pump 199 in main 238, and acting in various leads connected thereto, will be referred to as P.

In operation, the control system of Figures 6 and 7 in conjunction with the governor of Figure 5 and the throttle connected valve 240 of Figure 4 is arranged to operate all shifts through the four forward speeds automatically, by the combination of governor developed pressure with accelerator pedal controlled pressure.

It will be assumed that pump 199 is operating and valve 168' is in its uppermost position connecting ports 262 and 263, so that the hydraulic governor begins to provide pressure in line 138' and line 139'. However, the $W^1$ and $W^2$ weight characteristic creates a pressure on plungers 531 and 501 according to line O—III of chart of Figure 12.

On the chart line O—II represents the governor characteristic of valve 111' weighted at 124; line O—II' represents the governor characteristic of valve 115' weighted at 123'; and line O—III—II provides the summation of these two lines because the pressures in lines 138' and 139' are added by the plungers 501—503 for the front unit and by the plungers 531—533 for the rear unit, as will be apparent.

The force of $G^1$ and $G^2$ on plungers 501 and 303 is endeavoring to shift control valve 510 to admit pump pressure from port 514 to port 515.

With a light throttle, valve 240 is delivering a compensation pressure to ports 521 such that it aids the governor pressure in overcoming pump line pressure applied to plunger 523, which is normally tending to hold valve 510 in the "up" position, or the front unit in "low."

When the combined $G^1$ and $G^2$ pressure reaches 20 pounds, for example, or the governor shaft 110' a speed of 750 R. P. M., the additional compensation pressure, for example C, with G will overcome P; shifting valve 510 "down," to produce a shift to "direct" in the front unit.

However, at full throttle, the compensation pressure C will reduce to nearly zero, requiring G to rise to a value of about 63 pounds corresponding to a governor R. P. M. of 2600, for example.

These values are obtained by proper proportioning of the various valve and plunger areas as will be apparent to one skilled in the art.

To prevent hunting of valve 510, port 513 is connected to servo line and port 515, so as to add a sustaining pressure tending to hold the valve down, once having been moved to direct drive position (in this case 2nd speed) by the effort of G.

The shift from 2nd speed to 3rd speed ratio is accomplished by movement of the valve 540, according to $G^1$ and $G^2$ pressures, opposed by the effect of spring 550 and line pressure acting in port 547 on boss 539 and on the base of sleeve 541.

A variable throttle motion delivers a variable pressure to port 559 from valve 240 of Figure 7, and plunger 560 may move against the pressure in port 561 connected to the pump line 273. This sets up two conditions; first, at light throttle, full C pressure may cancel the effect of pressure in 561, on 560, so that the G value opposing spring 550 and line pressure in 547 may shift valve 540 "up;" at 46 pounds governor pressure, or 1150 R. P. M. of the governor, which will shift overall speed ratio from 2nd to 4th.

At full throttle, when driving in 2nd, the C pressure in 559 vanishes, and at a pump pressure of approximately 73 pounds, or a speed of 3300 R. P. M., $G^1$ and $G^2$ are able to overcome the spring 580 and line pressure in 547, and in 561, and engagement of the clutch of the rear unit begins to be established.

This extra load on the engine, due to the application of a mechanical advantage of the load against the engine by the upshift, brings down the engine speed.

The engine at the instantaneous load will then drop in speed to below 2400 R. P. M., for example.

A new control condition is established. Now, the values of $G^1$ and $G^2$ have fallen off to below 60 pounds, which by examination of the chart of Figures 11 and 12 places full line pressure on plunger 523, and pressure from line 273' to plunger 530, which since 521 at full throttle is drained, causes the force of $G^1$ and $G^2$ to be overcome; whereupon valve 510 shifts "up," and the front unit is put into reduction gear.

Now with the rear unit in direct and the front unit in low, the overall speed ratio is 3rd speed.

For the 3rd to 4th shift at light throttle, the G values acting on the front unit valve assembly are aided by throttle controlled pressure in 521, as noted previously, but the resisting force to the upshift tendency is increased by the pressure in port 528 acting on plunger 530, so that the governor has to go to a higher speed such as 1025 R. P. M., or a pressure of 37 pounds, to shift valve 510 "down," or to the direct drive position for the front unit, which will, of course, establish overall 4th speed ratio.

At full throttle, pressure in port 521 vanishes, so that the line pressure value in 524 under plunger 523, plus the additional pressure on plunger 530 from port 528 opposes G directly, so that the shift to 4th will not occur until a governor speed of 3670 R. P. M. or 79.5 pounds pressure is reached.

It should be noted that when driving in 4th speed ratio, the pressure in 513 is assisting the governor in holding the valve 510 in the "down" position. To produce a downshift, with the accelerator pedal fully depressed, it will be noted that the C pressure in port 521 vanishes, and that the force exerted by the sum of 528 and 523 is sufficient to overcome the G value and also the line pressure in port 513, provided the G valve does not exceed 60 pounds, or the governor a speed of 2400 R. P. M.

When, however, the pressure in 521 is increased as with light throttle setting, the elements involved in downshift are: plunger 523 feeling the line pressure in 524; plunger 530 feeling rear unit servo pressure in 528; resisted by the C pressure in port 521 on plunger 520; line pressure in port 513 acting on boss 507 and the G values, not exceeding 18 pounds, or corresponding to a governor speed of 700 R. P. M.

When the values on 523 and 530 overcome the values on 520, 507, 503, and 501, the valve 510 is shifted "up," putting the front unit in reduction gear; or establishing overall 3rd speed ratio.

When in 3rd speed ratio, the front unit is in reduction gear and the rear unit is in direct. It is desirable to maintain 3rd speed ratio in deceleration until a low car speed is reached.

At advanced throttle, with the engine speeds low, the C value in 559 vanishes, so that when the G value falls off so as to be overcome by the force of spring 550, therefore valve 540 will be shifted "up," yielding a change to overall low speed ratio, since the rear unit will now be in reduction gear. If, however, a light throttle shift is desired from 3rd to low overall ratio, the pressure in port 559 on plunger 554 opposes.

The area of plunger 554 is slightly smaller than the area of 560, yielding a small residual pressure tending to shift valve 540 "up" at a higher G value when the C value is not active. However, when a C value is present, the residual pressure is cancelled, and the downshift will occur at a lower G value, such as three pounds, or about 300 R. P. M.

If when driving in 2nd speed it is desirable to shift to low at full throttle, this may be accomplished up to 800 R. P. M. of the governor, or at below 22.5 pounds; in which the pressure in port 524 on 523 overcomes the pressure in port 513 and the G value. At light throttle, the C value in 521 opposes the pressure in port 524 on 523, so that the residual force on 523 is sufficient to overcome pressure in port 513 and a G value of 1.2 pounds or at a governor speed of 150 R. P. M.

It should be understood that the speed and pressure ranges between full throttle and light throttle control conditions constitute scales of pressure and speed over which an infinite number of incremental shift points may occur, as torque demand determined by the operator in movement of the accelerator pedal is equilibrated with the pressure conditions of the system, and that the values used in the above example are limiting or end points between which the shift effects occur.

These values are purely arbitrary, and are so chosen to illustrate the application of the principles of the invention. They may be modified by those skilled in the art without departing from the principles of invention disclosed herein.

In Figure 8 manually controlled valve 168' in bore 339 has 3 positions: first, when connecting ports 262—263, joining pump main 238 with governor input line 140'; second, when connecting 262—263—340' so that line 341' carries pump pressure to port 563 for plunger 565. The lowermost position cuts off pump port 262, dumping both lines 140' and 341' so that no automatic shift can take place when driving in reverse. These three positions correlated with the handlever control of Figure 13 correspond respectively to "neutral-high," "low," and "reverse," as is apparent from the camplate relationship of Figure 8.

In the preceding descriptions the valves which control directly the shift of ratio in the units have been considered as ratio selector valves. For example, in Figure 4 valve 168 controls the change of ratio in the rear unit, and valve 150 the change in the front unit. In Figures 6, 7 and 8, the valve 540 controls the rear unit, and 510 controls the front unit. In Figure 8, valve 168' is the master control valve which directs the pump pressure to the governor in accordance with the movement of the operator's handlever of Figure 13.

It should be further borne in mind that the sequences of the full automatic ratio control functions are arranged in a predetermined pattern wherein at a low governor speed, the throttle effect is not available to select ratio while the governor is determining upshift; at middle speed ranges of the governor, the throttle control effect coacts with that of the governor; and at high governor speeds the throttle effect is again inhibited. These three control ranges or regimes are readily apparent from study of the charts of Figures 9 to 12 inclusive, in conjunction with the foregoing text. It will be noted that among other advantages, this method protects the engine from abuse when the vehicle momentum is low and also when it is high, leaving the middle range for full activity of the driver-will control component.

Attention is again directed to the coordinated means for regulating the torque capacity of the friction drive elements, and the continuous minimum torque, or torque overlap characteristic of the servo actuation system associated therewith. The complete combination including full automatic shift through governor controlled elements coacting with driver-will controlled elements through fluid pressure governing and governed means is believed unique with my invention, and provides for the first time a step ratio gearing controlled in such a way that the results approximate those achieved by automatic infinitely variable transmission systems. That this approximation is factual, is demonstrated by the charts of Figures 9, 10, 11, and 12 derived from actual experience with the constructions of my invention.

The present demonstration includes inventions of my prior applications, insofar as parts of the whole may be compared therewith, but represents new unitary combinations as outlined in the foregoing specification.

A wide application of the principles of my invention is possible, wherever a variable speed transmission is required to yield speed ratio changes between a variable speed power source and a variable torque load, and wherein automatically controlled regimes of selective performance and economy are to be utilized to meet changing drive conditions. The field of application includes motor driven trucks, buses, railcars, military tanks and vehicle equipment of all types, and although the specific demonstration herewith is for a drive of the passenger car type, I reserve the right of application of the principles of the demonstration to these other forms, as outlined in the scope of the appended claims describing the spirit of the invention.

I claim:

1. In variable speed gearing controls, in combination, an engine, an engine throttle control, a power shaft driven by said engine, a load shaft, a variable speed transmission connected to said shafts, servo motor means adapted to shift the speed ratio of said transmission, a variable speed pump driven by said shafts including a suction inlet, a pressure outlet, hydraulic pressure means controlling the effective pump outlet pressure within a predetermined range of pressures, said means being also subject to spring pressure, speed ratio selecting means, a governor responsive to centrifugal speed connected to said outlet and to said selecting means, and means movable with said throttle control adapted to vary the effect of said governor upon said selecting means according to the position of said throttle control.

2. In automatically operated power transmission mechanisms, in combination, a power shaft, a load shaft, a pump driven by one of said shafts, a governor operating at the speed of one of the shafts, including a rotating valve, a pressure inlet space connected to said pump, a pressure outlet space, a variable speed transmission joining said shafts operated by fluid pressure actuating means connected to said pump, coacting speed ratio selecting devices connected to said outlet space adapted to control the setting of said actuating means according to the speed of said governor, and resisting means operating to oppose the action of said governor over a speed range whereby speed ratio is automatically selected according to values of predetermined speed of said governor and said resisting means.

3. In variable speed mechanisms, a fluid pressure source, a pressure main connected to said source, a speed ratio selecting device connected to said pressure main, a hydraulic speed-responsive governor adapted to provide a predetermined range of variable pressures between said main and said device, including a rotatable valve, and modifying means coacting with said device and operator-operable whereby the net effect of speed response of said governor upon said device is varied according to the will of the operator.

4. In power control devices, a variable speed transmission embodying speed ratio actuating means, a hydraulic governor including a primary centrifugal valve and a secondary centrifugal valve, pressure outlets connected to said valves, speed ratio selecting valving connected to said actuating means, and to said outlets, and manual means adapted to vary the action of said governor upon said valving according to the will of the operator.

5. In power transmission mechanisms, a first variable speed transmission unit, a second variable speed unit driven thereby, a ratio selecting device for said first unit, a ratio selecting device for said second unit, a hydraulic governor arranged to deliver variable pressures to said devices automatically according to speed values impressed upon it, and interconnecting means establishing coaction between said devices effective to prevent a ratio shift in one unit simultaneously with a ratio shift in the other unit.

6. In automatic power controls, for motor vehicles, in combination, an engine controlled by a throttle pedal, a power shaft driven by said engine, a variable speed transmission driven by said shaft and driving a load shaft, actuation means for said transmission, ratio selecting devices operative upon said actuation means, a hydraulic governor arranged to deliver variable pressures to said devices according to speed values of one of said shafts, and variable pressure means moved by said pedal coacting with said governor and effective upon said devices whereby the driving ratio of said transmission is selected and actuated according to the operator torque demand and the driving conditions.

7. In automatic controls for variable speed gearing, in combination, a governor including a centrifugal valve arranged to provide a primary range of predetermined pressures with variable speed applied to the governor, a second centrifugal valve arranged to provide a dissimilar secondary range of predetermined pressures with variable speed applied to the governor, and pressure responsive means adapted to respond to the combined pressures of both said ranges.

8. In automatic controls for variable speed gearing, in combination, a hydraulic governor embodying a pressure inlet, and a pressure outlet, a pressure resisting means, and a centrifugal valve acting against said means arranged to position itself according to applied speed and to the pressure of said outlet.

9. In pressure responsive controls for variable speed gearing, in combination, a centrifugal governor embodying a resisting means, and provided with inlet and outlet pressure, and a speed responsive valve subject to said inlet pressure, said resisting means, and to said outlet presure.

10. In pressure responsive control devices for variable speed gearing, a centrifugal governor provided with inlet and outlet pressure spaces, and outlet pressure control means comprising a primary valve of a given predetermined centrifugal force characteristic, a secondary valve of a dissimilar predetermined centrifugal force characteristic, both said valves being subject to said inlet pressure while responding to dissimilar outlet pressures.

11. In variable speed gearing, in combination, a power shaft, a first variable ratio transmission unit driven by said shaft, a second variable ratio transmission unit driven by said first named unit and connected to a load shaft, fluid pressure servo means arranged to actuate ratio shift in said units, selecting devices acting upon said servo means, a governor driven by one of said shafts including centrifugal valve mechanism connected to said devices, and additional control means coacting with said governor and said devices effective to modify the action of said mechanism upon said devices whereby speed ratio changes are established in said units according to the combined effect of governor speed and positioning of said control means.

12. In automatically controlled fluid pressure servo actuated systems of change speed gearing for motor vehicles, an engine, a driver operated speed control member for said engine, an output shaft, a step ratio gearing connecting said shaft to said engine including fluid pressure actuated elements for establishing various speed ratios therebetween; a fluid pressure system comprising a source, actuators for said elements and intervening control valving, members of said valving being responsive to variations in fluid pressure, a governor embodying a valve responsive to centrifugal force arranged to deliver continuously variable fluid pressure to said control valving according to changes in the centrifugal force of said valve, and a second valve controlled by movement of said member for modifying the effect of said governor-embodied valve on said control valving according to engine speed determining positions of said pedal.

13. In speed ratio controls for power transmissions, a power shaft and a load shaft, variable speed gearing therebetween having friction elements for establishing selected speed ratios of drive through said gearing, said elements being fluid pressure actuated, control valving operative to select actuation of said friction elements, pressure responsive means arranged to shift said control valving, and a weighted valve rotating at the speed of one of said shafts effective to establish a continuous series of pressures upon said pressure responsive means according to the rotating speed of said weighted valve.

14. In power transmissions for motor vehicles, a power shaft and a load shaft, variable speed gearing connecting said shafts, a rotating governor driven thereby embodying a plurality of weighted metering valves each being ported to receive a uniform input pressure and to deliver variable output pressures proportional to the speed of rotation of said governor, ratio selecting valving for said gearing, pressure responsive means joining said valving to the output pressures of said governor whereby automatic sequences of increasing and decreasing pressure are applied to said valving by said means, and fluid pressure actuated elements in said gearing are controlled by said valving whereby shifts in speed ratio of the gearing are established automatically according to said increasing and decreasing pressures.

15. In power transmission control devices, a variable speed gearing including multiple friction elements for establishing drive between said shafts, fluid actuating means for said elements, speed ratio selecting valving controlling the actuation of said elements by said means, a governor embodying a rotating metering valve adapted to supply a continuously variable pressure for shifting said ratio selecting valving according to variations in the speed of the governor, and auxiliary means adapted to modify the effect of said pressure upon said valving according to the will of the operator.

16. In power transmission devices, a power shaft and a load shaft, fluid actuated friction elements for establishing selected ratio drive between said shafts, selection valving controlling the actuation of said elements, and a governor driven at the speed of one of said shafts embodying a centrifugal metering valve adapted to deliver a continuously variable pressure to said selection valving.

17. In power transmissions for vehicles, a power shaft and a load shaft coupled by a variable ratio gearing embodying a plurality of friction elements for establishing a plurality of step speed ratios, fluid pressure means to actuate said elements, speed ratio selection valving adapted to compel actuation of said elements by said means, fluid pressure devices arranged to move said valving into different speed ratio determining positions, a servo pump connected to said selection valving for supplying actuation pressure to said means, and a governor including a centrifugally operated metering valve connected between said pump and said devices whereby said governor is effective to furnish a continuously variable pressure to said devices wherein predetermined sequences of speed ratio changes are impressed upon said selection valving.

18. In power transmission controls for motor vehicles, step-ratio gearing embodying friction elements for establishing drive in each of the ratios, actuators for said elements movable by fluid pressure, ratio selecting valving for said actuators, automatic means responsive to fluid pressure for shifting said valving according to predetermined sequences, a power driven pump connected to said valving, and a metering valve responsive to centrifugal force and to an increment of pressure derived from said pump for moving said automatic means, said valve being adapted to relieve any excess pressure from said pump.

19. In automatically controlled transmissions for motor vehicles, input and output shafts coupled by step ratio gearing having a plurality of friction elements for establishing drive between the shafts, fluid pressure operated actuators for said friction elements, a fluid pressure pump, a governor including a valve subject to fluctuations of fluid pressure and to the effect of centrifugal force, porting controlled by said valve connecting the pump with a pressure outlet, said pressure and said centrifugal effects combining to yield a resultant of increasing and decreasing output pressure approximately proportional to the square of the applied speed, and speed ratio selection valving for said actuators adapted to establish predetermined shift sequences thereby according to variations in the resultant output pressure of said valve.

20. In variable speed gearing controls for motor vehicles, an input shaft, a first two-speed ratio gearing unit connected to said shaft, a second two-speed ratio gearing unit driven thereby and driving an output shaft, a valve device for selecting the ratio of drive by said first unit, a second valve device for selecting the ratio of drive by said second unit, a governor driven by one of the shafts and delivering a continuously variable fluid pressure according to speed, fluid pressure responsive means operated by said continuously variable fluid pressure effective to shift both said valves for establishing predetermined speed ratio selecting positions, and a connection whereby the positioning of one of said valve devices determines the extent of action by said means on the other of said valves.

21. In automatic controls for motor vehicle transmissions, an engine, a speed control pedal for said engine, a power shaft driven by said engine, a load shaft, variable speed gearing coupling said shafts, a plurality of fluid pressure actuated friction clutches arranged to establish drive at selected speed ratios of said gearing, fluid pressure actuators effective to load said clutches with a controlled degree of pressure corresponding to predetermined torque capacity required for drive thereby, valving controlling said actuators for predetermined selection of ratio drive, fluid pressure means varied automatically and continuously for controlling the selection action of said valving, and a valve positioned by said pedal adapted to regulate the instantaneous torque capacity of any of said clutches during the interval of ratio shift simultaneously with modification of the continuously variable pressure effective upon said valving.

22. In power transmission devices, for motor vehicles, a throttle controlled engine, a load shaft, a step-ratio gearing embodying friction clutch elements arranged to deliver the torque of the engine through various paths of multiplication to said load shaft, actuators for said clutch elements arranged to transfer the driving torque from one to the other without release of torque for the ratio shift interval, a control for regulating the clutch torque capacity at which shift from one to the other takes place, a speed responsive governor including a metering valve delivering continuously variable fluid pressure according to speed, automatic speed ratio selection mechanism for said actuators controlled by the governor, and a pedal adapted to control the throttle of said engine, connected to said control and to said mechanism whereby for advanced throttle positions of the pedal the effect on said mechanism is to establish a ratio downshift tendency while influencing said control for establishing an increasing torque capacity on said clutches.

23. In a power transmission device, an engine, a speed control for said engine, a driving shaft, a driven shaft, speed ratio changing gearing therebetween, transmission speed ratio control means; a mechanism active thereupon embodying an element responsive to speed, an element responsive to torque demand of the vehicle operator as expressed in advancing or retarding the said control, and means interconnecting said elements and said ratio control means whereby the driving ratio of said gearing is determined jointly thereby, said interconnecting means including a member subject to differentially applied fluid pressure, one component of which is derived from movement of said engine speed control, and another of which is derived from the motion of the said speed responsive element of said mechanism.

24. In power control devices, for motor vehicles, an engine, an engine throttle pedal therefor, a step-ratio transmission embodying a plurality of friction driving elements and fluid pressure actuators therefor, ratio selecting valving for said actuators, a mechanism responsive to fluid pressure for moving said valving in various ratio determining combinations, a centrifugal governor arranged to apply a pressure in one direction to said mechanism to initiate a shift to a higher speed ratio by said control, and a valve operated in accordance with movement of said throttle pedal in both advancing and retarding said engine speeds, for applying a variable pressure to said mechanism to oppose the pressure applied by said governor, whereby the resultant speed ratio combination of said valving is derived from a differential of pressure applied to said mechanism by said governor and by said valve.

25. In power transmission controls for motor vehicles, a manually operated pedal, a fluid pressure actuated step-ratio transmission, fluid pressure actuation means for said transmission, valving controlling the actuation of said transmission, a speed responsive metering valve cooperating with and adapted to cause shifting of said control valving, a valve cooperating with said metering valve and operative in accordance with the positioning of said pedal and likewise adapted to cause shifting of said control valving, and means continuously operative upon said valving by changes in the fluid pressure delivered by both said valves, effective to change the speed ratio of said transmission and thereby the relative speeds of said shafts, through the control effect of said valving upon said fluid pressure actuation means.

26. In power transmissions for motor vehicles, a control pedal, step ratio gearing having a plurality of friction clutches arranged to transfer driving torque without release during the shift interval, speed ratio selection controls for said gearing, a mechanism adapted to shift said selection controls in predetermined sequences, a servo pump, a governor comprising speed responsive valve means connected to said mechanism and to said pump, a second valve means connected to said mechanism and to said pump for opposing the ratio shift effect of said governor and for regulating the torque capacity of said clutches, and connections between said control pedal and said second valve means whereby the degree of existing torque on any of said clutches is varied simultaneously with the opposition action to ratio shift on the part of the governor valve means.

27. In automatic controls for power transmissions of motor vehicles, a variable speed transmission having speed ratio changing elements including actuators effective to establish selected speed ratios of drive in said transmission, a shift selection mechanism therefor capable of compelling upshift and downshift in ratio by said actuators, a centrifugal governor including a valve arranged to deliver a force to said mechanism tending to establish upshift with increase in centrifugal speed, means to apply a force opposing the action of the governor, means to vary continuously the torque capacity of at least one of said clutches during the shift interval when said clutch is taking drive, and a coordinating control worked by said pedal and effective upon both said means varying with successive positioning of said pedal.

28. In power transmission controls, for motor vehicles, a variable step-ratio gearing embodying a plurality of friction, torque-sustaining members, actuation means for said members, control means for said actuation means effective to establish a plurality of speed ratios within said gearing in accordance with a predetermined shift ratio pattern, said control means including valving adapted to initiate a ratio shift interval wherein under all inter-ratio shifts the torque is always released from one of said members while being assumed by another of said members, a plurality of loading actuators for said members subject to fluid pressure distributed by said valving, and a control pedal coacting with said control means immediately effective upon initial movement of said valving for setting up a ratio shift interval, to proportion the torque capacity of that member assuming the drive in accordance with the positioning of said control pedal.

29. In speed ratio control mechanisms, for motor vehicles, a control pedal, a rotating valve responsive to centrifugal speed, a second valve responsive to control pedal position, a device operated by the valves having a speed ratio changing regime embracing three control ranges, in the first range of which the degree of fluid pressure supplied by said centrifugal valve determines the speed at which initial upshift occurs, in the second range of which the control effect on speed ratio change is determined by the pressures supplied by both valves, and in the third of which the control effect on ratio shift is determined entirely by the pressure supplied by said rotating valve, a variable speed transmission including step-ratio elements engageable for establishing a series of geared couples between input and output shafts, actuating means for said elements, and a coordinating mechanism for said means and operated by said device for compelling step-ratio shifts by said elements according to the control ranges impressed by said valves on said device.

30. In power transmissions, for motor vehicles, a control pedal, a power and a load shaft, a transmission unit coupling said shafts, a clutch and a brake effective to establish direct or geared drive in said unit, fluid pressure actuation means for said clutch and brake, a selector valve arranged to cause alternate actuation of said clutch or brake, mechanism connected to move said valve to alternate actuation-compelling positions, means responsive to variations in fluid pressure for shifting said mechanism in one direction, a stored energy device for shifting the mechanism in the opposite direction, a speed-responsive fluid pressure supply for said means, and a second fluid pressure supply for said means controlled manually by said pedal, whereby the action of said device may be manually controlled between limits determined by said first-named supply.

31. In power transmission drives, in motor vehicles, a variable speed gearing having a series of friction elements arranged to transfer drive from one speed ratio to another without release of driving torque, selectively operated actuation means for said elements, selection control means effective upon said actuation means for establishing a series of driving ratios in said gearing, and a separate device operative upon said actuation means effective only when said control means is moved to select a new driving ratio, for determining the torque capacity at which the transfer of drive occurs.

32. In power control devices, a power shaft and a load shaft, a step-ratio gearing arranged to deliver continuous torque between the shafts, a plurality of friction elements to sustain the drive for various speed ratio combination of said gearing, shiftable members for engaging and disengaging said elements, fluid pressure servo means adapted to actuate the said members, a second fluid pressure means adapted to regulate the degree of actuation of said servo means, valving connected to select the distribution of fluid pressure to said first named means for establishing selective speed ratio drive by said elements of said gearing wherein the torque is invariably first taken up by the elements assuming the drive before being released from those elements selected for non-driving in all inter-ratio shifts of said elements, regardless of the regulation action of said second fluid pressure means, and an additional movable control for said second fluid pressure means operative to control the said degree of actuation, whereby the drive sustaining characteristics of those elements selected for drive by said valving is regulated according to the degree of movement of said additional movable control.

33. In power control devices, a fluid pressure actuated variable speed gearing, control devices effective to shift the ratio of said gearing, a shaft driven by said gearing, a valve casing rotating with said shaft, a pair of valves arranged in said casing for radial motion under rotation applied to said shaft, porting adapted to supply fluid pressure to said valves, further porting delivering an output pressure proportional to the radial positions assumed by said valves, and mechanism responsive to said output pressure for automatically shifting said control devices into selective speed ratio determining combinations.

34. In power control devices, an engine shaft and a load shaft, a step-ratio transmission system including two transmission units in series, the driving elements of which are adapted to maintain a continuous torque between said shafts for all forward driving speed ratios, automatic ratio changing means connected to establish shifts of ratio in said system, operator control means adapted to select drive only for forward, reverse and neutral, and a separate operator control effective immediately upon a shift of ratio by said automatic means to vary the degree of said continuous torque whereby the degree of movement of said control varies directly the value of torque transmitted through said transmission.

35. In automatic change-speed mechanism for automotive vehicles, an engine and a load shaft, a step ratio transmission arranged for constantly coupling the engine and the shaft in all forward driving speed ratios, a plurality of friction elements adapted to establish the various driving ratios of said transmission, shiftable actuating means effective to engage and disengage said elements, selecting means operative to control the shifting of said actuating means, speed responsive mechanism connected to said selecting means for automatically establishing changes in speed ratio of said transmission, and a separate movable control means arranged to modify the actuation of said elements by said actuation means according to the motion of said control means, said control means being instantly effective upon movement of said selecting means from one ratio determining position to another ratio determining position.

36. In power transmissions for motor vehicles, an engine and a load carrying member, a variable speed gearing coupling said engine and member, fluid pressure means adapted to shift the speed ratios of said gearing, a shaft driven by said gearing, control valves for said means, a hydraulic governor embodying a casing attached to or integral with said shaft, valving movable within recesses in said casing subject to fluid pressure and responsive to variations in speed of said shaft, a gland carrying fluid pressure passages associated with said casing and connecting to said control valves, and porting for said valving connected to said gland and arranged with respect to the movement of said valving so that a continuously variable pressure is available in said passages to position said control valves for the respective speed ratios determined by said means.

37. In motor vehicle controls for power transmissions, an engine and a load carrying member, variable speed gearing coupling said engine and said member, a shaft driven by said gearing, a pump, one pumping element of which is driven by said shaft, a governor driven by said shaft, fluid pressure means for changing the speed ratio of said gearing, control valving joining said means to said pump whereby the pump pressure is distributed to actuate elements of said gearing for maintaining drive, and connecting mechanism between said governor and said valving arranged to establish settings of said valving according to variations in speed of said shaft.

38. In power transmission controls for motor vehicles, a step ratio transmission unit, fluid pressure means arranged to shift the speed ratio of said unit, a control valve operative thereupon adapted to establish direct drive in said unit when placed in one position and to establish geared drive when placed in a second position, a fluid pressure governor providing two stages of output pressure, shifting means for said valve responsive to the pressure of the first stage of said governor and to the second stage of said governor, arranged to shift said valve from said second position to said first position upon increase in speed of said governor to a given speed, and additional control means effective to modify the action of said means and thereby vary the resultant motion of said valve so as to shift at a different speed than the said given speed of said governor.

39. In power control devices, a step-ratio gearing embodying a plurality of friction elements for establishing selected speed ratio drive, fluid pressure actuation means for one of said elements, a second fluid pressure actuation means for another of said elements, valve mechanism for said means movable to predetermined positions for establishing drive by said elements, a movable control device adapted to vary the degree of actuation of said elements according to the movement of the device, and a connection between said mechanism and said device selectively effective when one of said elements is engaged or released, to modify the control of said device over the degree of actuation of the other of said elements.

40. In power control devices, a step-ratio transmission having friction elements adapted to establish selected forward and reverse ratio drive therein, fluid pressure supplied actuators for said elements, valving movable to predetermined positions for selective operation of said actuators in such a manner that continuous uninterrupted torque is maintained under all forward driving ratio conditions, an automatically positioned mechanism effective upon said valving to establish shift of forward speed ratios in said gearing, a manually positioned mechanism movable over a range of positions effective to establish sequentially, reverse, neutral and forward drive through said gearing, and having a further position beyond the forward drive-establishing position wherein said automatically positioned mechanism is permitted to become fully effective upon said valving.

41. In variable speed transmissions for motor vehicles, a power control pedal, fluid pressure actuated change speed gearing controlled by valving, fluid pressure operated members arranged to establish forces tending to shift said valving to low speed ratio determining positions when said pedal is depressed, and a governor operative to oppose the action of said members adapted to select low speed ratio at low speeds, to select intermediate and high speed ratios in conjunction with the positions of said members at intermediate speeds, and to select high speed only without conjoint action with said members at extreme high speeds.

42. In motor vehicles embodying power transmission devices, a fluid pressure controlled step-ratio gearing effective to transmit drive between an engine and a load member, a pump, a centrifugal governor associated with said gearing adapted to receive an input pressure from said pump, said governor having one pressure outlet providing a series of pressures of predetermined proportion to the speed applied to said shaft, and having a second pressure outlet providing a different series of pressures of a different predetermined proportion to said speed, speed ratio selecting valve mechanism connected to said outlets arranged to establish sequences of ratio shift in said gearing, and means controlled by the operator to vary the relative effect of said outlet pressures on said mechanism.

43. In power control devices, a power shaft and a load shaft, step-ratio gearing connecting said shafts, friction elements adapted to be engaged and released for selective speed ratio drive through said gearing, a spring for actuating one of said elements, a power cylinder, a piston in said cylinder arranged to store energy in said spring, a second piston in said cylinder arranged to oppose the force of said spring, fluid pressure valving controlling the effective pressure on said first piston, whereby one of said elements is released while another is being engaged, and further valving controllable for varying the effective pressure on said second piston, whereby to graduate the action of release and engagement of said elements by said spring and said first piston.

44. In power devices, a power shaft and a load shaft, a step-ratio gearing embodying a plurality of friction elements adapted to establish selected speed ratios between said shafts, fluid pressure operated mechanism arranged to actuate said elements, a supply source of fluid pressure, a master control valve for distributing fluid pressure, ratio selecting valving for operating said mechanism connected to said master control valve, a compensating valve for controlling the torque capacities of said elements through alterations in the effective pressures established in said mechanism, a pump driven by said gearing supplying pressure to said master valve, said compensating valve and to said ratio selecting valving, a governor driven by said gearing embodying a speed responsive metering valve arranged to deliver predetermined pressures to said ratio selecting valving for positioning same in various ratio determining positions, and means controlled by said master valve for rendering said governor effective or ineffective according to operator movement thereof.

45. In power devices, a step-ratio gearing, fluid pressure actuating and operating devices therefor embodying a coacting control valve mechanism having a manually operable metering valve, speed responsive metering valving and a ratio selecting valve, the manually operable metering valve being connected to affect the positioning of said selecting valve, the speed responsive valving being likewise connected to affect the positioning of said selecting valve, the selecting valve being movable between pressure admission and relief positions for adjusting said actuating devices, means for applying the output pressure of said speed responsive valving to shift said selecting valve between said positions, and additional means controlled by the prior conditioning of said selecting valve for a predetermined ratio setting for changing the response of said selecting valving to the said output pressure of said speed responsive valving according to the said prior conditioning of the selecting valve.

46. In power control devices, a step-ratio gearing adapted to deliver continuous torque between an engine and a load shaft, fluid pressure actuating means for said gearing, valving movable by fluid pressure to establish forward driving ratios in said gearing by distribution of fluid pressure to said actuating means and movable to positions determining a high speed ratio and a lower speed ratio, a governor device including automatic means controlling the application of fluid pressure to said valving, manually operated means arranged to vary the effect of said automatic means upon said valving, and auxiliary control means coacting with said automatic means and said valving whereby at speeds of said governor above a predetermined value, the higher speed ratio is engaged and the lower speed ratio disengaged.

47. In power control devices, a step-ratio gearing adapted to maintain continuous drive between a power shaft and a load shaft, fluid pressure actuating means for said gearing, selector valving therefor movable between positions determining a high speed and a lower speed ratio between said shafts, governor mechanism arranged to move said valving by fluid pressure developed in accordance with varying speed, auxiliary mechanism for modifying the action of said governor controlled fluid pressure, and additional control means coacting with said valving and said mechanism whereby at speeds above a predetermined speed, the ability of said auxiliary mechanism to modify the governor action is set aside.

48. In automatically controlled power transmissions for motor vehicles, a step-ratio gearing arranged to transmit continuous torque between a power and a load shaft through a plurality of friction elements, selectively operable fluid pressure actuating means for said elements, a fluid pressure system including a pump and selector valving shiftable to distribute fluid pressure to said means, a speed responsive governor mechanism operable through fluid pressure to shift said valving for automatic changing of ratio of said gearing, and a manually operable mechanism likewise operable through variations in fluid pressure to oppose the action of said governor applied pressure whereby the automatic change of ratio may be influenced manually.

49. In power regulating devices, a throttle control pedal, a load shaft, a step-ratio gearing arranged to transmit continuous torque therebetween through a plurality of friction elements, actuating means for said elements, a pump, valving connecting said pump to said actuating means, a governor operable through fluid pressure to shift said valving for automatic ratio changing of said gearing, and a mechanism moved by the pedal operable through variations in fluid pressure to oppose the action of said governor whereby the automatic change of ratio is modified according to the throttle control pedal.

50. In power transmissions for motor cars, an engine, a throttle pedal controlling the speed of the engine, a power shaft driven by said engine, a load shaft, a change speed gearing having a plurality of friction elements which are engaged and released while delivering continuous torque between said shafts, fluid pressure actuating means for said elements, a pump driven by rotation of said engine, control valving distributing the pressure of said pump to said means, a governor delivering fluid pressure according to the speed of one of said shafts and effective to shift said valving, additional pressure control means arranged to vary the fluid pressure delivered by said governor, a regulating valve adapted to vary the engaging pressure of said means on said elements, and connecting means between said pedal, said regulating valve and said additional pressure control means whereby predetermined movement of the pedal may compel a shift of speed ratio while increasing or diminishing the engaging pressure of the friction element selected to drive.

EARL A. THOMPSON.